US012170553B2

(12) United States Patent
Yu et al.

(10) Patent No.: US 12,170,553 B2
(45) Date of Patent: Dec. 17, 2024

(54) INFORMATION SENDING METHOD, INFORMATION RECEIVING METHOD, AND RELATED DEVICE

(71) Applicant: HUAWEI TECHNOLOGIES CO., LTD., Shenzhen (CN)

(72) Inventors: Jian Yu, Beijing (CN); Yawei Yu, Shenzhen (CN); Zhiheng Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/300,717

(22) Filed: Apr. 14, 2023

(65) Prior Publication Data

US 2023/0254018 A1 Aug. 10, 2023

Related U.S. Application Data

(63) Continuation of application No. PCT/CN2020/121662, filed on Oct. 16, 2020.

(51) Int. Cl.
*H04B 7/04* (2017.01)
*H04B 7/0456* (2017.01)

(52) U.S. Cl.
CPC .................................. *H04B 7/0456* (2013.01)

(58) Field of Classification Search
CPC .... H04B 7/04; H04B 7/04026; H04B 7/0404; H04B 7/0408; H04B 7/0413; H04B 7/0456
See application file for complete search history.

(56) References Cited

U.S. PATENT DOCUMENTS

2012/0039251 A1* 2/2012 Sayana ................ H04B 7/0639 370/328
2017/0126298 A1* 5/2017 Einhaus ............... H04B 7/0632
2020/0059906 A1* 2/2020 Gupta .................. H04L 5/0053
2024/0214041 A1* 6/2024 Yuan .................... H04B 7/0473

* cited by examiner

*Primary Examiner* — Freshteh N Aghdam
(74) *Attorney, Agent, or Firm* — Rimon PC

(57) ABSTRACT

Embodiments of this application provide an information sending method, an information receiving method, and a related device. In the information sending method, a network device sends first signaling that carries first indication information, and the network device further sends second signaling that carries second indication information. The first indication information indicates a subset identifier corresponding to a first precoding subset in a first codebook. The first codebook includes a plurality of precoding subsets. Each precoding subset includes a plurality of precoding matrices, and different precoding subsets correspond to different subset identifiers. The second indication information indicates a matrix identifier corresponding to a first precoding matrix in the first precoding subset. Precoding matrices in the first precoding subset correspond to different matrix identifiers, and the first precoding matrix is used to precode a physical uplink shared channel (PUSCH) carried on a first subband.

20 Claims, 12 Drawing Sheets

| Index | Precoding matrix in a single-layer transmission codebook using four antenna ports | | | | | | | |
|---|---|---|---|---|---|---|---|---|
| 0–7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8–15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16–23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-1\\-j\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24–27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | - | - | - | - |

FIG. 3

| Index | Precoding matrix in a single-layer transmission codebook using four antenna ports | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-1\\-j\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | - | - | - | - |

FIG. 4

| Index | Precoding matrix in a single-layer transmission codebook using four antenna ports | | | | | | | |
|---|---|---|---|---|---|---|---|---|
| 0–7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8–15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16–23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-1\\-j\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24–27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | - | - | - | - |

FIG. 5

INFORMATION SENDING METHOD, INFORMATION RECEIVING METHOD, AND RELATED DEVICE

CROSS-REFERENCE TO RELATED APPLICATIONS

This application is a continuation of International Application No. PCT/CN2020/121662, filed on Oct. 16, 2020, the disclosure of which is hereby incorporated by reference in its entirety.

TECHNICAL FIELD

This application generally relates to the field of wireless communication, and in particular, to an information sending method, an information receiving method, and a related device.

BACKGROUND

In a multi-user multiple-input multiple-output (MU-MIMO) system, a spatial diversity and a multiplexing gain can be obtained by using a precoding technology, and interference between a plurality of users can be reduced, to help improve spectrum utilization.

Uplink precoding includes a codebook-based precoding technology and a non-codebook-based precoding technology. In the codebook-based precoding technology, a transmit device and a receive device agree that the transmit device uses a precoding matrix in a codebook. For example, currently, a precoding indication manner for a physical uplink shared channel (PUSCH) is that a network device determines a precoding matrix from a codebook based on a channel status of a terminal device, and sends an index (that is, a transmitted precoding matrix indicator (TPMI) information) of the precoding matrix in the codebook to the terminal device by using downlink control information (DCI), so that the terminal device precodes, by using the precoding matrix, data carried on the PUSCH. In this manner, if the precoding matrix indicated by the network device by using the DCI is specific to a broadband, that is, the terminal device uses a same precoding matrix in a system bandwidth, system performance may be affected by a channel with a high frequency selective feature. If the precoding matrix indicated by the network device by using the DCI is specific to a subband, signaling overheads of the DCI are increased.

SUMMARY

Embodiments of this application provide an information sending method, an information receiving method, and a related device. According to the method provided in this application, low signaling overheads can be achieved while system performance is ensured.

According to a first aspect, embodiments of this application provide an information sending method. In the method, a network device sends first signaling that carries first indication information, and the network device further sends second signaling that carries second indication information, where the first indication information indicates a subset identifier corresponding to a first precoding subset in a first codebook, the first codebook includes a plurality of precoding subsets, each precoding subset includes a plurality of precoding matrices, and different precoding subsets correspond to different subset identifiers; and the second indication information indicates a matrix identifier corresponding to a first precoding matrix in the first precoding subset, precoding matrices in the first precoding subset correspond to different matrix identifiers, and the first precoding matrix is used to precode a physical uplink shared channel (PUSCH) carried on a first subband.

The frequency band includes a frequency domain resource of a specific width, for example, a system bandwidth, a bandwidth part (BWP), or an actual allocated scheduled bandwidth. The frequency band includes a plurality of resource blocks (RBs). The subband is a part of the frequency domain resource in the frequency band, and may also include a plurality of resource blocks, where a quantity of resource blocks in the subband is less than a quantity of resource blocks in the frequency band. The subband is also understood as a resource unit in a frequency band. For example, the frequency band includes 100 resource blocks, and every four resource blocks in the frequency band may be configured to form a resource block group, that is, a subband.

A precoding matrix for precoding the PUSCH carried on the first subband is indicated by using two levels of signaling, so that flexibility of indicating the precoding matrix for the subband is improved, and low signaling overheads can be achieved while system performance is ensured.

With reference to the first aspect, in a possible implementation, the second indication information further indicates a matrix identifier corresponding to a second precoding matrix in the first precoding subset, the second precoding matrix is used to precode a PUSCH carried on a second subband, and the second subband and the first subband are different frequency domain resources in a same frequency band.

With reference to the first aspect, in another possible implementation, a first frequency band includes a plurality of third subbands, a second frequency band includes a plurality of fourth subbands, the first subband is one of the plurality of fourth subbands, and a frequency domain resource included in one fourth subband is a subset of frequency domain resources included in one third subband; and the first indication information indicates a subset identifier of a precoding subset corresponding to each third subband, and the second indication information indicates a matrix identifier of a precoding matrix corresponding to each fourth subband.

With reference to the first aspect, in another possible implementation, the first indication information indicates a subset identifier of a precoding subset corresponding to each subband in a first frequency band, the second indication information indicates a matrix identifier of a precoding matrix corresponding to each subband in the first frequency band, and the first subband is a subband in the first frequency band.

With reference to the first aspect, in another possible implementation, the first frequency band and the second frequency band each are an activated BWP of a terminal device.

With reference to the first aspect, in another possible implementation, the first frequency band and the second frequency band each are a frequency domain resource currently allocated by the network device to a PUSCH of a terminal device.

With reference to the first aspect, in another possible implementation, the first frequency band is an activated BWP of a terminal device, and the second frequency band is a frequency domain resource currently allocated by the network device to a PUSCH of the terminal device. The frequency domain resource allocated to the PUSCH is less than the activated BWP. Therefore, even if a subband granularity of the frequency domain resource allocated to the PUSCH is smaller, a quantity of subbands in the second frequency band may be set to be less than a quantity of subbands in the first frequency band, so that a precoding matrix can be more accurately indicated to match channels on different subbands, and overheads of the second signaling can be reduced.

With reference to the first aspect, in another possible implementation, the first signaling further carries first subset information, and the first subset information is used to determine a plurality of precoding matrices in the first precoding subset.

With reference to the first aspect, in another possible implementation, when the first signaling is downlink control information (DCI), the first signaling further carries first resource location information, and the first resource location information indicates a frequency domain resource and/or a time domain resource carrying the second signaling. A resource location of the second signaling is indicated, which reduces difficulty and a quantity of times of blind detection performed by the terminal device on the second signaling.

With reference to the first aspect, in another possible implementation, the precoding matrix in the first codebook is determined based on a first phase factor and a second phase factor, and the first phase factor and the second phase factor each have at least two different values; and precoding matrices in a same precoding subset are determined based on a same value of the first phase factor and different values of the second phase factor. This improves flexibility of determining and indicating the precoding matrix in the codebook.

With reference to the first aspect, in another possible implementation, the first signaling is media access control (MAC) signaling or DCI, and the second signaling is DCI.

A second aspect of embodiments of this application provides an information receiving method. In the method, a terminal device receives first signaling that carries first indication information, and the terminal device further receives second signaling that carries second indication information, where the first indication information indicates a subset identifier corresponding to a first precoding subset in a first codebook, the first codebook includes a plurality of precoding subsets, each precoding subset includes a plurality of precoding matrices, and different precoding subsets correspond to different subset identifiers; and the second indication information indicates a matrix identifier corresponding to a first precoding matrix in the first precoding subset, precoding matrices in the first precoding subset correspond to different matrix identifiers, and the first precoding matrix is used to precode a PUSCH carried on a first subband.

A precoding matrix for precoding the PUSCH carried on the first subband is indicated by using two levels of signaling, so that flexibility of indicating the precoding matrix for the subband is improved, and low signaling overheads can be achieved while system performance is ensured.

With reference to the second aspect, in a possible implementation, the second indication information further indicates a matrix identifier corresponding to a second precoding matrix in the first precoding subset, the second precoding matrix is used to precode a PUSCH carried on a second subband, and the second subband and the first subband are different frequency domain resources in a same frequency band.

With reference to the second aspect, in another possible implementation, a first frequency band includes a plurality of third subbands, a second frequency band includes a plurality of fourth subbands, the first subband is one of the plurality of fourth subbands, and a frequency domain resource included in one fourth subband is a subset of frequency domain resources included in one third subband; and the first indication information indicates a subset identifier of a precoding subset corresponding to each third subband, and the second indication information indicates a matrix identifier of a precoding matrix corresponding to each fourth subband.

With reference to the second aspect, in another possible implementation, the first indication information indicates a subset identifier of a precoding subset corresponding to each subband in a first frequency band, the second indication information indicates a matrix identifier of a precoding matrix corresponding to each subband in the first frequency band, and the first subband is a subband in the first frequency band.

With reference to the second aspect, in another possible implementation, the first subband includes at least one resource block (RB), and each third subband includes at least one resource block. In the method, the terminal device may further determine a target third subband from the plurality of third subbands based on a resource block identifier of a resource block included in the first subband, where the resource block of the target third subband includes each resource block in the first subband; and the terminal device obtains the first precoding subset based on a subset identifier corresponding to the target third subband, and obtains the first precoding matrix from the first precoding subset based on a matrix identifier corresponding to the first subband.

With reference to the second aspect, in another possible implementation, the first frequency band and the second frequency band each are an activated BWP of the terminal device.

With reference to the second aspect, in another possible implementation, the first frequency band and the second frequency band each are a frequency domain resource currently allocated by a network device to a PUSCH of the terminal device.

With reference to the second aspect, in another possible implementation, the first frequency band is an activated BWP of the terminal device, and the second frequency band is a frequency domain resource currently allocated by a network device to a PUSCH of the terminal device. The frequency domain resource allocated to the PUSCH is less than the activated BWP. Therefore, even if a subband granularity of the frequency domain resource allocated to the PUSCH is smaller, a quantity of subbands in the second frequency band may be set to be less than a quantity of subbands in the first frequency band, so that a precoding matrix can be more accurately indicated to match channels on different subbands, and overheads of the second signaling can be reduced.

With reference to the second aspect, in another possible implementation, the first signaling further carries first subset information, and the first subset information is used to determine a plurality of precoding matrices in the first precoding subset.

With reference to the second aspect, in another possible implementation, when the first signaling is DCI, the first signaling further carries first resource location information, and the first resource location information indicates a frequency domain resource and/or a time domain resource carrying the second signaling. A resource location of the second signaling is indicated, which reduces difficulty and a quantity of times of blind detection performed by the terminal device on the second signaling.

With reference to the second aspect, in another possible implementation, the precoding matrix in the first codebook is determined based on a first phase factor and a second phase factor, and the first phase factor and the second phase factor each have at least two different values; and precoding matrices in a same precoding subset are determined based on a same value of the first phase factor and different values of the second phase factor. This improves flexibility of determining and indicating the precoding matrix in the codebook.

With reference to the second aspect, in another possible implementation, the first signaling is MAC signaling or DCI, and the second signaling is DCI.

A third aspect of embodiments of this application provides a network device. The network device includes a transceiver module, configured to send first signaling that carries first indication information, and is further configured to send second signaling that carries second indication information, where the first indication information indicates a subset identifier corresponding to a first precoding subset in a first codebook, the first codebook includes a plurality of precoding subsets, each precoding subset includes a plurality of precoding matrices, and different precoding subsets correspond to different subset identifiers; and the second indication information indicates a matrix identifier corresponding to a first precoding matrix in the first precoding subset, precoding matrices in the first precoding subset correspond to different matrix identifiers, and the first precoding matrix is used to precode a PUSCH carried on a first subband.

A precoding matrix for precoding the PUSCH carried on the first subband is indicated by using two levels of signaling, so that flexibility of indicating the precoding matrix for the subband is improved, and low signaling overheads can be achieved while system performance is ensured.

With reference to the third aspect, in a possible implementation, the second indication information further indicates a matrix identifier corresponding to a second precoding matrix in the first precoding subset, the second precoding matrix is used to precode a PUSCH carried on a second subband, and the second subband and the first subband are different frequency domain resources in a same frequency band.

With reference to the third aspect, in another possible implementation, a first frequency band includes a plurality of third subbands, a second frequency band includes a plurality of fourth subbands, the first subband is one of the plurality of fourth subbands, and a frequency domain resource included in one fourth subband is a subset of frequency domain resources included in one third subband; and the first indication information indicates a subset identifier of a precoding subset corresponding to each third subband, and the second indication information indicates a matrix identifier of a precoding matrix corresponding to each fourth subband.

With reference to the third aspect, in another possible implementation, the first indication information indicates a subset identifier of a precoding subset corresponding to each subband in a first frequency band, the second indication information indicates a matrix identifier of a precoding matrix corresponding to each subband in the first frequency band, and the first subband is a subband in the first frequency band.

With reference to the third aspect, in another possible implementation, the first frequency band and the second frequency band each are an activated BWP of a terminal device.

With reference to the third aspect, in another possible implementation, the first frequency band and the second frequency band each are a frequency domain resource currently allocated by the network device to a PUSCH of a terminal device.

With reference to the third aspect, in another possible implementation, the first frequency band is an activated BWP of a terminal device, and the second frequency band is a frequency domain resource currently allocated by the network device to a PUSCH of the terminal device. The frequency domain resource allocated to the PUSCH is less than the activated BWP. Therefore, even if a subband granularity of the frequency domain resource allocated to the PUSCH is smaller, a quantity of subbands in the second frequency band may be set to be less than a quantity of subbands in the first frequency band, so that a precoding matrix can be more accurately indicated to match channels on different subbands, and overheads of the second signaling can be reduced.

With reference to the third aspect, in another possible implementation, the first signaling further carries first subset information, and the first subset information is used to determine a plurality of precoding matrices in the first precoding subset.

With reference to the third aspect, in another possible implementation, when the first signaling is DCI, the first signaling further carries first resource location information, and the first resource location information indicates a frequency domain resource and/or a time domain resource carrying the second signaling. A resource location of the second signaling is indicated, which reduces difficulty and a quantity of times of blind detection performed by the terminal device on the second signaling.

With reference to the third aspect, in another possible implementation, the precoding matrix in the first codebook is determined based on a first phase factor and a second phase factor, and the first phase factor and the second phase factor each have at least two different values; and precoding matrices in a same precoding subset are determined based on a same value of the first phase factor and different values of the second phase factor. This improves flexibility of determining and indicating the precoding matrix in the codebook.

With reference to the third aspect, in another possible implementation, the first signaling is MAC signaling or DCI, and the second signaling is DCI.

A fourth aspect of embodiments of this application provides a terminal device, including a receiving module, configured to receive first signaling that carries first indication information, and further configured to receive second signaling that carries second indication information, where the first indication information indicates a subset identifier corresponding to a first precoding subset in a first codebook, the first codebook includes a plurality of precoding subsets, each precoding subset includes a plurality of precoding matrices, and different precoding subsets correspond to different subset identifiers; and the second indication information indicates a matrix identifier corresponding to a first precoding matrix in the first precoding subset, precoding matrices in the first precoding subset correspond to different matrix identifiers, and the first precoding matrix is used to precode a PUSCH carried on a first subband.

A precoding matrix for precoding the PUSCH carried on the first subband is indicated by using two levels of signaling, so that flexibility of indicating the precoding matrix for the subband is improved, and low signaling overheads can be achieved while system performance is ensured.

With reference to the fourth aspect, in a possible implementation, the second indication information further indicates a matrix identifier corresponding to a second precoding matrix in the first precoding subset, the second precoding matrix is used to precode a PUSCH carried on a second subband, and the second subband and the first subband are different frequency domain resources in a same frequency band.

With reference to the fourth aspect, in another possible implementation, a first frequency band includes a plurality of third subbands, a second frequency band includes a plurality of fourth subbands, the first subband is one of the plurality of fourth subbands, and a frequency domain resource included in one fourth subband is a subset of frequency domain resources included in one third subband; and the first indication information indicates a subset identifier of a precoding subset corresponding to each third subband, and the second indication information indicates a matrix identifier of a precoding matrix corresponding to each fourth subband.

With reference to the fourth aspect, in another possible implementation, the first indication information indicates a subset identifier of a precoding subset corresponding to each subband in a first frequency band, the second indication information indicates a matrix identifier of a precoding matrix corresponding to each subband in the first frequency band, and the first subband is a subband in the first frequency band.

With reference to the fourth aspect, in another possible implementation, the first subband includes at least one resource block, and each third subband includes at least one resource block; and the terminal device may further include a processing module, and the processing module is configured to: determine a target third subband from the plurality of third subbands based on a resource block identifier of a resource block included in the first subband, where a resource block in the target third subband includes each resource block in the first subband; obtain the first precoding subset based on a subset identifier corresponding to the target third subband; and obtain the first precoding matrix from the first precoding subset based on a matrix identifier corresponding to the first subband.

With reference to the fourth aspect, in another possible implementation, the first frequency band and the second frequency band each are an activated BWP of the terminal device.

With reference to the fourth aspect, in another possible implementation, the first frequency band and the second frequency band each are a frequency domain resource currently allocated by a network device to a PUSCH of the terminal device.

With reference to the fourth aspect, in another possible implementation, the first frequency band is an activated BWP of the terminal device, and the second frequency band is a frequency domain resource currently allocated by a network device to a PUSCH of the terminal device. The frequency domain resource allocated to the PUSCH is less than the activated BWP. Therefore, even if a subband granularity of the frequency domain resource allocated to the PUSCH is smaller, a quantity of subbands in the second frequency band may be set to be less than a quantity of subbands in the first frequency band, so that a precoding matrix can be more accurately indicated to match channels on different subbands, and overheads of the second signaling can be reduced.

With reference to the fourth aspect, in another possible implementation, the first signaling further carries first subset information, and the first subset information is used to determine a plurality of precoding matrices in the first precoding subset.

With reference to the fourth aspect, in another possible implementation, when the first signaling is DCI, the first signaling further carries first resource location information, and the first resource location information indicates a frequency domain resource and/or a time domain resource carrying the second signaling. A resource location of the second signaling is indicated, which reduces difficulty and a quantity of times of blind detection performed by the terminal device on the second signaling.

With reference to the fourth aspect, in another possible implementation, the precoding matrix in the first codebook is determined based on a first phase factor and a second phase factor, and the first phase factor and the second phase factor each have at least two different values; and precoding matrices in a same precoding subset are determined based on a same value of the first phase factor and different values of the second phase factor. This improves flexibility of determining and indicating the precoding matrix in the codebook.

With reference to the fourth aspect, in another possible implementation, the first signaling is MAC signaling or DCI, and the second signaling is DCI.

A fifth aspect of embodiments of this application provides another communication apparatus. The communication apparatus may be a transmitting end device or a receiving end device in a communication network, or may be a part of a transmitting end device or a part (such as a circuit or a chip) of a receiving end device, and includes a processor, a memory, and a transceiver. The processor, the memory, and the transceiver are connected to each other. The transceiver is configured to: receive and send data, the memory is configured to store the foregoing program, and the processor is configured to invoke the program stored in the memory. When the program is executed by a computer, the computer is enabled to perform the method according to any one of the first aspect and the possible implementations of the first aspect, or perform the method according to any one of the second aspect and the possible implementations of the second aspect. The processor and the memory may be physically independent units, or the memory may be integrated with the processor.

A sixth aspect of this application provides a computer-readable medium. The computer-readable medium stores instructions, and when the instructions are run on a computer, the computer is enabled to perform the method according to any one of the first aspect and the possible implementations of the first aspect, or perform the method according to any one of the second aspect and the possible implementations of the second aspect.

A seventh aspect of this application provides a computer program product. The computer program product includes computer program code, and when the computer program code is run on a computer, the computer is enabled to perform the method according to any one of the first aspect and the possible implementations of the first aspect, or perform the method according to any one of the second aspect and the possible implementations of the second aspect.

An eighth aspect of this application provides a chip. The chip includes a processor and a communication interface. The processor is coupled to the communication interface, to implement the method according to any one of the first aspect and the possible implementations of the first aspect, or implement the method according to any one of the second aspect and the possible implementations of the second aspect.

BRIEF DESCRIPTION OF DRAWINGS

FIG. 3 is a schematic diagram in which a first codebook shown in Table 1 includes a precoding subset according to an embodiment of this application;

FIG. 4 is another schematic diagram in which a first codebook shown in Table 1 includes a precoding subset according to an embodiment of this application;

FIG. 5 is still another schematic diagram in which a first codebook shown in Table 1 includes a precoding subset according to an embodiment of this application;

DESCRIPTION OF EMBODIMENTS

The following describes technical solutions of this application with reference to the accompanying drawings.

The technical solutions of embodiments of this application may be applied to various communication systems, such as a machine type communication (MTC) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) system, or a new radio (NR) system.

Figure 1:
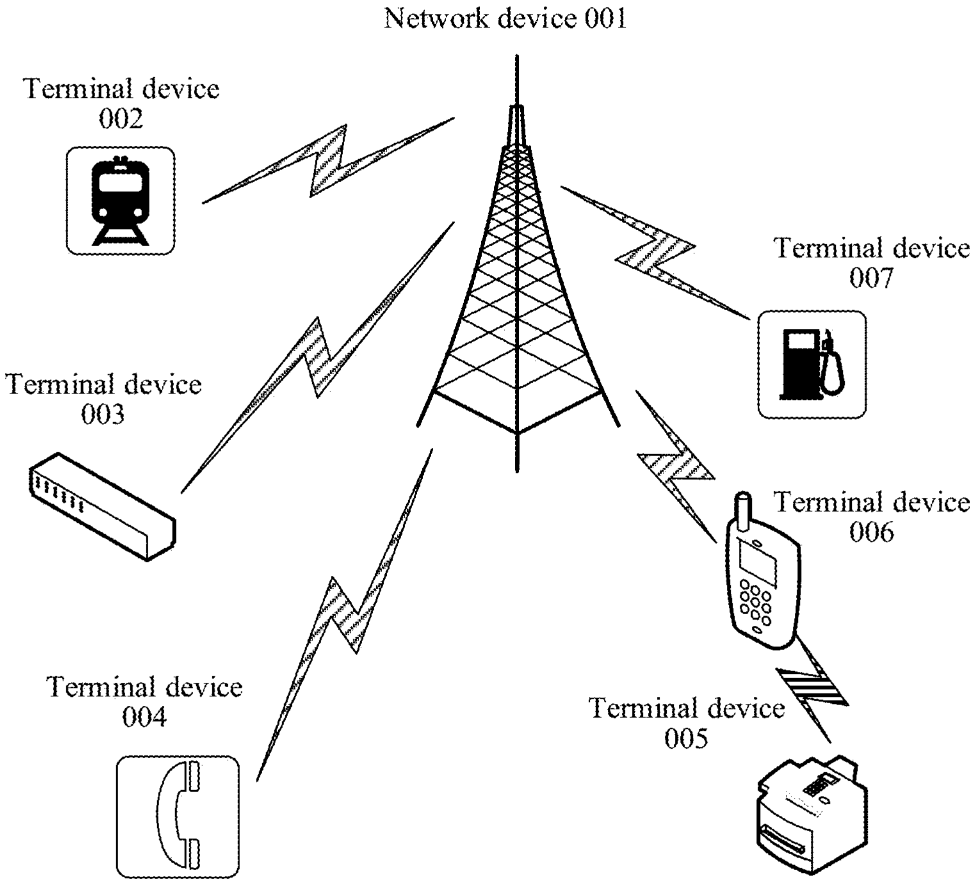
FIG. 1 is a schematic diagram of a communication system according to an embodiment of this application.

The communication system includes at least one network device and at least one terminal device. FIG. 1 is a schematic diagram of a communication system according to an embodiment of this application. FIG. 1 is used as an example to describe a communication system to which embodiments of this application are applied. FIG. 1 shows an example of one network device, that is, a network device 001, and five terminal devices, that is, a terminal device 002, a terminal device 003, a terminal device 004, a terminal device 005, a terminal device 006, and a terminal device 007.

Optionally, a plurality of antennas may be configured for any network device or any terminal device, and the configured plurality of antennas may include at least one transmit antenna used to send a signal and at least one receive antenna used to receive a signal. The network device and the terminal device may communicate with each other by using a multi-antenna technology.

The network device in the communication system in embodiments of this application may be a device configured to perform wireless communication with the terminal device. The network device includes but is not limited to an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), an access point (AP) in a wireless fidelity (Wi-Fi) system, a wireless relay node, a wireless backhaul node, a transmission point (TP), a transmission and reception point (TRP), or the like, may be a gNB in 5G, for example, an NR system, a transmission point (TRP or TP), or one or one group of antenna panels of a base station in a 5G system, or may be a network node that forms a gNB or a transmission point, for example, a BBU or a distributed unit (DU). Details are not described. A technology, a device form, and a name that are used by the network device are not limited in embodiments of this application.

The terminal device in the communication system in embodiments of this application may also be referred to as user equipment (UE), a mobile station, a remote station, or the like, and is a network device having a wireless transceiver function. The terminal may be deployed on land, including indoor or outdoor, handheld, wearable, or vehicle-mounted, or may be deployed on water (for example, on a ship), or may be deployed in the air (for example, on an airplane, a balloon, or a satellite). The terminal in embodiments of this application may be a mobile phone, a tablet computer (e.g., Pad), a computer having a wireless transceiver function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. Details are not described. A technology, a device form, and a name that are used by the terminal device are not limited in embodiments of this application.

To better understand embodiments of this application, the following describes technologies or objects that may be used in embodiments of this application. It should be understood that the following descriptions are merely example descriptions for assisting related understanding, and are not intended to limit the protection scope of embodiments of this application.

1. Precoding Technology

A transmit device (for example, a terminal device) may select, when a channel status is known, a precoding matrix that matches a channel of a corresponding frequency domain resource to process a to-be-sent signal, so that a precoded to-be-sent signal adapts to the channel, to obtain more spatial diversity and multiplexing gains, and further help reduce interference between users. Therefore, after the to-be-sent signal is precoded, received signal quality (for example, a signal to interference plus noise ratio (SINR)) is improved. Therefore, using the precoding technology can help improve transmission performance of the transmit device and a plurality of receive devices on a same frequency domain resource, that is, improve performance of a multi-user multiple-input multiple-output system (MU-MIMO).

2. Precoding Matrix

Layer mapping may map data from a codeword to a transmission layer, so that the data can be mapped from the transmission layer to an antenna port by using a precoding matrix. The codeword is a coded transport block sent at a transmission time interval (TTI). The transmission layer corresponds to a radio reflection mode, and a quantity of used transmission layers is referred to as a rank. The antenna port may be a logical transmit channel defined by using a reference signal. One antenna port may be one physical transmit antenna or a combination of a plurality of physical transmit antennas.

It is assumed that after layer mapping is performed on to-be-transmitted data, the to-be-transmitted data is mapped to ν transmission layers, and a precoding matrix W with a dimension of ν×ρ is used to map the data at the ν transmission layers to ρ antenna ports. An example mapping formula may be shown in Formula (1):

$$\begin{bmatrix} z^{(p_0)}(i) \\ \cdots \\ z^{(p_{j-1})}(i) \\ \cdots \\ z^{(p_{\rho-1})}(i) \end{bmatrix} = W \begin{bmatrix} y^{(0)}(i) \\ \cdots \\ y^{(k-1)}(i) \\ \cdots \\ y^{(\upsilon-1)}(i) \end{bmatrix} \quad \text{Formula (1)}$$

Herein, $y^{(k-1)}(i)$ is data at a $k^{th}$ transmission layer before precoding, k is an index of the transmission layer, $0 \le k \le \nu-1$, $z^{(p_{j-1})}(i)$ is data mapped to a $j^{th}$ antenna port after precoding, j is an index of the antenna port, and $0 \le j \le \rho-1$.

For example, for two-antenna single-layer transmission, a dimension of the precoding matrix W is 1×2, and a corresponding mapping formula is Formula (2):

$$\begin{bmatrix} z^{(p_0)}(i) \\ Z^{(p_1)}(i) \end{bmatrix} = W\left[y^{(0)}(i)\right] \quad \text{Formula (2)}$$

For single-antenna transmission, the precoding matrix W is 1, that is, no precoding is performed.

3. Codebook

The codebook includes a plurality of precoding matrices. In a codebook-based precoding technology, a transmit device and a receive device may obtain a plurality of same codebooks, so that a to-be-used codebook can be selected based on a quantity of used transmission layers and a quantity of used antenna ports, and a to-be-used precoding matrix is agreed on from the codebook based on a channel status.

The codebooks obtained by the transmit device and the receive device may be codebooks defined in the 3rd Generation Partnership Project (3GPP) protocol, or may be codebooks determined in another manner. This is not limited herein. Only a single-layer transmission codebook that uses four antenna ports and that is defined in the 3GPP protocol is used as an example. For details, refer to Table 1.

TABLE 1

| Index | Precoding matrix in a single-layer transmission codebook using four antenna ports | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-1\\-j\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | — | — | — | — |

The codebook in Table 1 shows 28 precoding matrices, and each precoding matrix corresponds to a different index in the foregoing codebook. Indexes of precoding matrices shown in each of the second row to the fifth row in Table 1 are in ascending order from left to right, and the indexes may be used to distinguish between and indicate different precoding matrices in the codebook.

4. Frequency Band and Subband

The frequency band includes a frequency domain resource of a specific width, for example, a system bandwidth, a BWP, or an actually allocated scheduled bandwidth. The frequency band includes a plurality of resource blocks. The subband is a part of the frequency domain resource in the frequency band, and may also include a plurality of resource blocks, but a quantity of resource blocks in the subband is less than a quantity of resource blocks in the frequency band. The subband is also understood as a resource unit in a frequency band. For example, the frequency band includes 100 resource blocks, and every four resource blocks in the frequency band may be configured to form a resource block group, that is, a subband.

The following describes, with reference to FIG. 2 to FIG. 8, methods provided in embodiments of this application. In the method, a precoding matrix for precoding a PUSCH carried on a first subband may be indicated by using two levels of signaling, so that low signaling overheads can be achieved while system performance is ensured.

Figure 2:
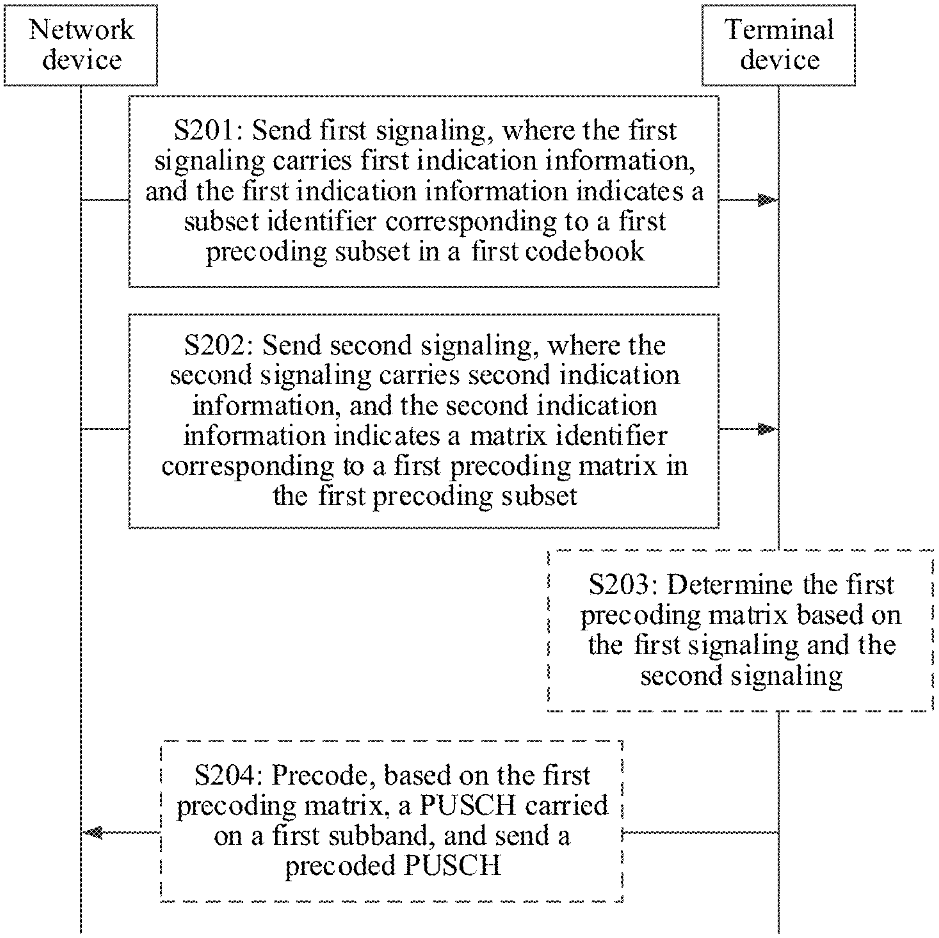
FIG. 2 is a schematic flowchart of an information transmission method according to an embodiment of this application.

First, FIG. 2 is a schematic flowchart of an information transmission method according to an embodiment of this application. As shown in FIG. 2, the method includes at least steps S201 and S202.

S201: Send first signaling, where the first signaling carries first indication information, and the first indication information indicates a subset identifier corresponding to a first precoding subset in a first codebook.

The first codebook includes a plurality of precoding subsets, each precoding subset includes a plurality of precoding matrices, and different precoding subsets in the first codebook correspond to different subset identifiers.

The first codebook may be a codebook determined by a network device based on a transmission layer and an antenna port that are used by a PUSCH of a terminal device. The first codebook includes a plurality of precoding matrices. The following describes how to determine a precoding matrix included in each precoding subset in the first codebook.

In a first alternative implementation, if the precoding matrices in the first codebook has indexes in the first codebook, the precoding matrices in the first codebook may be grouped based on the indexes of the precoding matrices in the first codebook, and the grouped precoding matrices form different precoding subsets.

For example, every K precoding matrices with consecutive indexes in the first codebook may be grouped into one group, to form a precoding subset, where K is less than a total quantity of precoding matrices included in the first codebook. If the first codebook is the codebook shown in Table 1, the first codebook shown in Table 1 is used as an example for description. For the first codebook in Table 1, K=4, that is, precoding matrices whose indexes are 0 to 3 form a precoding subset, precoding matrices whose indexes are 4 to 7 form a precoding subset, and so on. For details, refer to FIG. 3. FIG. 3 is a schematic diagram in which a first codebook shown in Table 1 includes a precoding subset according to an embodiment of this application. A precoding matrix in a dashed-line box shown in FIG. 3 is a precoding matrix included in a precoding subset, and a precoding subset corresponding to each dashed-line box has a different subset identifier.

For another example, every (N+1) precoding matrices in the first codebook may alternatively be grouped into one group, to form a precoding subset, where N is less than a quantity of precoding matrices included in the first codebook. If the first codebook is the codebook shown in Table 1, the first codebook shown in Table 1 is used as an example. For the first codebook in Table 1, N=7, that is, precoding matrices whose indexes are 0, 8, 16, and 24 form a precoding subset, precoding matrices whose indexes are 1, 9, 17, and 25 form a precoding subset, and so on. For details, refer to FIG. 4. FIG. 4 is another schematic diagram in which a first codebook shown in Table 1 includes a precoding subset according to an embodiment of this application. A precoding matrix in a dashed-line box shown in FIG. 4 is a precoding matrix included in a precoding subset, and a precoding subset corresponding to each dashed-line box has a different subset identifier.

For another example, every M precoding matrices in the first codebook may alternatively be used as a grouping unit, and precoding matrices in J grouping units that are spaced by L grouping units form a precoding subset, where M, L, and J each are less than a quantity of precoding matrices included in the first codebook. If the first codebook is the codebook shown in Table 1, the first codebook shown in Table 1 is used as an example. For the first codebook in Table 1, M=2, L=3, and J=2, that is, precoding matrices whose indexes are 0, 1, 8, and 9 form a precoding subset, precoding matrices whose indexes are 2, 3, 10, and 11 form a precoding subset, and so on. For details, refer to FIG. 5. FIG. 5 is still another schematic diagram in which a first codebook shown in Table 1 includes a precoding subset according to an embodiment of this application. A precoding matrix in a dashed-line box shown in FIG. 5 is a precoding matrix included in a precoding subset, and a precoding subset corresponding to each dashed-line box has a different subset identifier.

It should be understood that, in a process of grouping the precoding matrices in the first codebook to form the precoding subset, quantities of precoding matrices included in the precoding subsets may be the same, may be different, or may not be completely the same. For example, in the example corresponding to FIG. 4, because the first codebook includes a total of 28 precoding matrices, there are four precoding matrices in each of precoding subsets corresponding to four dashed-line boxes on the left in FIG. 4, and there are three precoding matrices in each of precoding subsets corresponding to four dashed-line boxes on the right in FIG. 4.

The first alternative manner may be applied to any codebook including a precoding matrix having a determined index, for example, a single-layer transmission codebook using dual antenna ports (e.g., Table 6.3.1.5-1 in 3GPP TS 38.211), a dual-layer transmission codebook using dual antenna ports (e.g., Table 6.3.1.5-4 in 3GPP TS 38.211), or a single-layer transmission codebook using four antenna ports (e.g., Table 6.3.1.5-2 in 3GPP TS 38.211) defined in the 3GPP protocol. Details are not described. For a codebook that includes a precoding matrix whose precoding index is not determined, for example, a transmission codebook using eight antenna ports, a transmission codebook using two antenna ports that is determined in another manner, or a transmission codebook using four antenna ports that is determined in another manner, an index may be first set for a precoding matrix in the transmission codebook, and then a precoding matrix included in each precoding subset is determined in the first alternative manner.

It should be noted that the foregoing manner of determining the precoding subset based on the index of the precoding matrix is merely an example implementation. In some other implementations, grouping may be further performed based on another feature of the precoding matrix in the first codebook, and a same grouping effect may be obtained. For example, based on a location feature of the precoding matrix, for the first codebook shown in Table 1, precoding matrices in a same column may form a precoding subset. The precoding subset that is in the first codebook and that is obtained in this manner may be the same as a precoding subset obtained in a grouping manner based on an index of a precoding matrix in FIG. 4. Details are not described herein again.

In a second alternative implementation, the precoding matrix in the first codebook is determined based on a plurality of matrix parameters, and at least two matrix parameters have different values. The precoding matrix included in the precoding subset may be determined based on different values of the matrix parameters. Specifically, for matrix parameters having different values, a value of at least one matrix parameter may be fixed, and different values of other matrix parameters are traversed, so that obtained precoding matrices form a precoding subset, then another possible value is reassigned to a matrix parameter having a fixed value, and different values of other matrix parameters are traversed, so that obtained precoding matrices form another precoding matrix subset, and so on, until all possible values are assigned to the matrix parameter having the fixed value.

For example, the matrix parameter includes a first phase factor and a second phase factor. That is, the precoding matrix in the first codebook may be determined based on the first phase factor and the second phase factor, and the first phase factor and the second phase factor each have at least two different values. In a process of determining a precoding matrix in a precoding subset, a value of the first phase factor may be fixed, and values of the second phase factor are traversed. In a process of determining a precoding matrix in another precoding subset, another possible value is reassigned to the first phase factor, and values of the second phase factor are traversed. In other words, precoding matrices in a same precoding subset are determined based on a same value of the first phase factor and different values of the second phase factor.

It should be understood that there may be one or more first phase factors or second phase factors. When there are a plurality of first phase factors, in a process of determining precoding matrices in a same precoding subset, a value of each first phase factor is fixed. When there are a plurality of second phase factors, in a process of determining precoding matrices in a same precoding subset, second phase factors corresponding to all precoding matrices are not completely the same. In other words, in a process of determining different precoding matrices in the same precoding subset, values of some second phase factors may remain unchanged, but a value of at least one second phase factor changes.

Descriptions are provided below by using an example in which the first codebook is a single-layer transmission codebook using eight antenna ports. In an implementation, a precoding matrix $V_8^{(1)}$ in the single-layer transmission codebook using eight antenna ports may be determined by using Formula (3):

Formula (3)

$$V_8^{(1)} = \frac{1}{\sqrt{p \cdot q}} \cdot \begin{bmatrix} \begin{bmatrix} \begin{bmatrix} 1 \\ B \end{bmatrix} \\ \begin{bmatrix} 1 \\ D \end{bmatrix} \cdot \exp(j\varepsilon) \end{bmatrix} \\ \begin{bmatrix} \begin{bmatrix} 1 \\ E \end{bmatrix} \\ \begin{bmatrix} 1 \\ F \end{bmatrix} \cdot \exp(j\delta) \end{bmatrix} \cdot \exp(j\phi) \end{bmatrix}$$

Herein, B, D, E, and F, $\in \{\exp(j\theta)\}$, $$\theta = 0 : \frac{2\pi}{N_1} : \frac{(N_1 - 1) \times 2\pi}{N_1},$$

-continued $$\varepsilon = 0 : \frac{2\pi}{N_2} : \frac{(N_2 - 1) \times 2\pi}{N_2},$$

$$\delta = 0 : \frac{2\pi}{N_3} : \frac{(N_3 - 1) \times 2\pi}{N_3},$$

$$\phi = 0 : \frac{2\pi}{N_4} : \frac{(N_4 - 1) \times 2\pi}{N_4},$$

p is a quantity of rows of the precoding matrix, and q is a quantity of columns of the precoding matrix. θ, ε, δ, and ϕ are phase factors, and $N_1$, $N_2$, $N_3$, and $N_4$ are quantization factors. The quantization factor may control a granularity of the first codebook. A larger value of the quantization factor indicates more values of the phase factor. Correspondingly, more precoding matrices in the first codebook are determined and obtained. Precision of the first codebook may be controlled by controlling a value of the quantization factor. An operation of a=b:c:d indicates that a is set to a value at an interval of c in an interval [b, d].

In Formula (3), two matrix parameters: a phase factor and a quantization factor are included. In a process of determining the precoding matrix in the first codebook by using Formula (3), one phase factor has a plurality of different values, and one quantization factor has only one value. Therefore, in a process of determining the precoding matrix included in the precoding subset, values of R phase factors in the foregoing four phase factors may be fixed (the R phase factors are the foregoing first phase factors), where R is an integer greater than 0 and less than 4, and possible values of other 4-R phase factors are traversed (the 4-R phase factors are the foregoing second phase factors).

For example, it is assumed that the phase factor θ has two possible values: $\theta_1$ and $\theta_2$, the phase factor ε has three possible values: $\varepsilon_1$, $\varepsilon_2$, and $\varepsilon_3$, the phase factor δ has two possible values: $\delta_1$ and $\delta_2$, and the phase factor ϕ has two possible values $\phi_1$ and $\phi_2$. In addition, R=2, values of the phase factors θ and ε are fixed (when R=2, values of any two of the phase factors θ, ε, δ, and ϕ may be fixed, and an example in which the values of θ and ε are fixed is used herein), and values of the phase factors δ and ϕ are traversed to determine a precoding matrix included in the precoding subset. For details, refer to Table 2.

TABLE 2

| Precoding subset | Precoding matrix | θ | ε | δ | ϕ |
|---|---|---|---|---|---|
| Precoding subset 1 | Precoding matrix 1 | $\theta_1$ | $\varepsilon_1$ | $\delta_1$ | $\phi_1$ |
| | Precoding matrix 2 | $\theta_1$ | $\varepsilon_1$ | $\delta_1$ | $\phi_2$ |
| | Precoding matrix 3 | $\theta_1$ | $\varepsilon_1$ | $\delta_2$ | $\phi_1$ |
| | Precoding matrix 4 | $\theta_1$ | $\varepsilon_1$ | $\delta_2$ | $\phi_2$ |
| Precoding subset 2 | Precoding matrix 5 | $\theta_1$ | $\varepsilon_2$ | $\delta_1$ | $\phi_1$ |
| | Precoding matrix 6 | $\theta_1$ | $\varepsilon_2$ | $\delta_1$ | $\phi_2$ |
| | Precoding matrix 7 | $\theta_1$ | $\varepsilon_2$ | $\delta_2$ | $\phi_1$ |
| | Precoding matrix 8 | $\theta_1$ | $\varepsilon_2$ | $\delta_2$ | $\phi_2$ |
| Precoding subset 3 | Precoding matrix 9 | $\theta_1$ | $\varepsilon_3$ | $\delta_1$ | $\phi_1$ |
| | Precoding matrix 10 | $\theta_1$ | $\varepsilon_3$ | $\delta_1$ | $\phi_2$ |
| | Precoding matrix 11 | $\theta_1$ | $\varepsilon_3$ | $\delta_2$ | $\phi_1$ |
| | Precoding matrix 12 | $\theta_1$ | $\varepsilon_3$ | $\delta_2$ | $\phi_2$ |
| Precoding subset 4 | Precoding matrix 13 | $\theta_2$ | $\varepsilon_1$ | $\delta_1$ | $\phi_1$ |
| | Precoding matrix 14 | $\theta_2$ | $\varepsilon_1$ | $\delta_1$ | $\phi_2$ |
| | Precoding matrix 15 | $\theta_2$ | $\varepsilon_1$ | $\delta_2$ | $\phi_1$ |
| | Precoding matrix 16 | $\theta_2$ | $\varepsilon_1$ | $\delta_2$ | $\phi_2$ |
| Precoding subset 5 | Precoding matrix 17 | $\theta_2$ | $\varepsilon_2$ | $\delta_1$ | $\phi_1$ |
| | Precoding matrix 18 | $\theta_2$ | $\varepsilon_2$ | $\delta_1$ | $\phi_2$ |
| | Precoding matrix 19 | $\theta_2$ | $\varepsilon_2$ | $\delta_2$ | $\phi_1$ |
| | Precoding matrix 20 | $\theta_2$ | $\varepsilon_2$ | $\delta_2$ | $\phi_2$ |
| Precoding subset 6 | Precoding matrix 21 | $\theta_2$ | $\varepsilon_3$ | $\delta_1$ | $\phi_1$ |
| | Precoding matrix 22 | $\theta_2$ | $\varepsilon_3$ | $\delta_1$ | $\phi_2$ |

TABLE 2-continued

| Precoding subset | Precoding matrix | θ | ε | δ | ϕ |
|---|---|---|---|---|---|
| | Precoding matrix 23 | $\theta_2$ | $\varepsilon_3$ | $\delta_2$ | $\phi_1$ |
| | Precoding matrix 24 | $\theta_2$ | $\varepsilon_3$ | $\delta_2$ | $\phi_2$ |

In Table 2, each precoding subset includes four precoding matrices, and each precoding matrix is determined based on values of all phase factors in a same row. For example, the precoding subset 1 includes four precoding matrices: precoding matrices 1 to 4. The four precoding matrices are determined based on θ and ε (that is, $\theta_1$ and $\varepsilon_1$) whose values are the same and δ and ϕ whose values are not completely the same.

It should be understood that subset identifiers of precoding subsets are used to distinguish between different precoding subsets. The subset identifier may be a subset index corresponding to the precoding subset. For example, subset indexes of precoding subsets corresponding to seven dashed-line boxes in FIG. 3 may be sequentially set to 0, 1, 2, 3, 4, 5, and 6. The subset identifier of the precoding subset may also be in another form. This is not limited herein.

The plurality of precoding subsets included in the first codebook are described above, and the subset identifier that is of the first precoding subset and that is indicated by the first indication information in the first signaling is described below.

After determining the first codebook used by the PUSCH of the terminal device, the network device determines a matched first precoding subset from all precoding subset in the first codebook based on a channel status of the terminal device, and then indicates the subset identifier of the first precoding subset by using the first indication information. Optionally, the first precoding subset may be a matched precoding subset determined by the network device for the first frequency band, or may be a matched precoding subset determined by the network device for a subband in the first frequency band. Optionally, the first frequency band may be an activated BWP of the terminal device, or may be a frequency domain resource (which may also be referred to as a scheduled bandwidth) currently allocated by the network device to the PUSCH of the terminal device.

An optional manner in which the network device determines the first precoding subset is as follows: the network device selects, according to a maximum channel capacity criterion, a precoding subset that has a maximum channel capacity as the first precoding subset. If the network device determines the first precoding subset for the first frequency band, the first precoding subset maximizes a capacity of the first frequency band. If the network device determines the first precoding subset for a subband in the first frequency band, the first precoding subset maximizes a capacity of the first frequency band.

For example, a single-layer transmission codebook is used as an example. It may be assumed that power of a user k on an $m^{th}$ frequency domain resource (for example, the frequency domain resource may be a subcarrier) is represented as $p^{k,m}$, an uplink channel matrix of the user k on the $m^{th}$ frequency domain resource is represented as $H_{k,m}$ (that is, a channel from the user k to the network device), and an SINR on the $m^{th}$ frequency domain resource may be represented as $\gamma_{k,m}$. $\gamma_{k,m}$ may be represented by using Formula (4):

$$\gamma_{k,m} = \frac{p_{k,m} \cdot |g_{k,m} H_{k,m} w_k|^2}{|g_{k,m}(I_{k,m} + \sigma^2)|^2} \quad \text{Formula (4)}$$

Herein, $g_{k,m}$ is a weight coefficient on a receive antenna of abase station, $w_k$ is a precoding vector of the user k, $I_{k,m}$ an inter-cell interference covariance matrix, and $\sigma^2$ is noise power. Herein, $g_{k,m}=(H_{k,m}w_k)^H$ may be obtained by using a matched filtering method.

Further, if the network device determines the first precoding subset for the first frequency band, the network device may select a matched precoding subset according to a total capacity maximization criterion of each frequency domain resource in the first frequency band. If the first frequency band includes M frequency domain resources, a total capacity of each frequency domain resource in the first frequency band may be represented as $$\sum_{m=1}^{M} \log_2(1 + \gamma_{k,m}),$$

where m is an index of each frequency domain resource in the first frequency band. Then, the first precoding subset $\Phi_s$ having a maximum total capacity in the first codebook is solved according to Formula (5):

$$\arg\max \left\{ \sum_{m=1}^{M} \log_2(1 + \gamma_{k,m}) \right\} \quad \text{Formula (5)}$$
$$\text{s.t.}^{\{\Phi s\}} \quad \Phi_s \in \Phi$$

Herein, Φ is a set including all precoding subsets in the first codebook, and a subset identifier of the first precoding subset $\Phi_s$ is indicated by using first indication information.

If the network device determines the first precoding subset for a subband in the first frequency band, the network device may select a matched precoding subset according to a capacity maximization criterion of the subband. An SINR on each frequency domain resource in the subband may be determined according to Formula (4), and an average SINR of the subband may be obtained based on the SINR on each frequency domain resource in the subband. For example, SINRs on different frequency domain resources included in the subband are mapped to an equivalent SINR of the subband by using an exponential effective SINR mapping method. The equivalent SINR of the subband is denoted as $\gamma_{k,s}$, and the first precoding subset $\Phi_s$ that maximizes the capacity of the subband in the first codebook may be solved by using Formula (6):

$$\arg\max\{\log_2(1+\gamma_{k,s})\}$$
$$s.t.^{\{\Phi s\}} \Phi_s \in \Phi \quad \text{Formula (6)}$$

Herein, Φ is a set including all precoding subsets in the first codebook, and a subset identifier of the first precoding subset $\Phi_s$ is indicated by using first indication information.

It should be understood that, in Formula (5) and Formula (6), a channel capacity is calculated by using the Shannon formula, or a channel capacity may be calculated in another manner. This is not limited herein.

It should be noted that the subbands included in the first frequency band may be obtained through division in a plurality of manners. The following describes two example division manners.

In a first division manner, the first frequency band may be an activated BWP, and a size of each subband in the first frequency band may be determined based on a total quantity of resource blocks included in the activated BWP and a higher-layer parameter.

Specifically, the network device may determine, based on a resourceAllocation field in the higher-layer parameter ConfiguredGrantConfig, resource block group (RBG)-based resource allocation for the terminal device, and determine, based on rbg-Size in the higher-layer parameter ConfiguredGrantConfig and a predefined mapping table between a BWP size and an RBG size, a quantity of resource blocks RBs included in each RBG, that is, a quantity of RBs included in one subband. The predefined mapping table between the BWP size and the RBG size may be shown in Table 3.

TABLE 3

| BWP size | Configuration1 | Configuration2 |
|---|---|---|
| 1-36 | 2 | 4 |
| 37-72 | 4 | 8 |
| 73-144 | 8 | 16 |
| 145-275 | 16 | 16 |

If a size of the first frequency band (that is, an activated BWP) is 80, and rbg-Size in ConfiguredGrantConfig is configured as Configuration1, each subband in the first frequency band includes eight resource blocks.

In a second division manner, the first frequency band may be an activated BWP or a frequency domain resource currently allocated by the network device to the PUSCH, and a size of a subband in the first frequency band may be configured by using configuration information. For example, a quantity of RBs included in the subband may be any one of 2, 4, 8, or 16.

The following describes indication information that is in the first signaling and that indicates the first precoding subset. In an optional implementation, the first signaling sent by the network device may be MAC signaling. In another optional implementation, the first signaling sent by the network device may be DCI. Indication information that is carried when the first signaling is MAC signaling may not be completely the same as indication information that is carried when the first signaling is DCI. The following describes a plurality of optional implementations of the first signaling in different cases.

In a first optional implementation, the first signaling may be MAC signaling, and the first signaling indicates the first precoding subset for each subband (a subband in the first frequency band may be denoted as a third subband) in the first frequency band. For example, the network device may determine, with reference to an example corresponding to Formula (6), a precoding subset that matches each subband in the first frequency band, and then indicate, in the first signaling by using the first indication information, a subset identifier corresponding to each subband in the first frequency band.

In a second optional implementation, with reference to the first optional implementation, the first signaling may further include first subset information, and the first subset information may be used to determine a plurality of precoding matrices in each precoding subset in the first codebook.

For example, in the foregoing first alternative implementation of determining the precoding matrix included in each precoding subset in the first codebook, there may be a plurality of manners of grouping precoding matrices based on an index of the precoding matrix, and correspondences between subset information and different grouping manners may be predefined, so that first subset information corresponding to a used first grouping manner is indicated in the first signaling.

For another example, in the foregoing second alternative implementation of determining the precoding matrix included in each precoding subset in the first codebook, the precoding matrix included in each precoding subset may be determined based on a first phase factor and a second phase factor, precoding matrices in a same precoding subset correspond to a same first phase factor and different values of second phase factors, and the first subset information may indicate first phase factors with fixed values. For example, when the precoding matrix in the first codebook is determined based on a phase factor 1 and a phase factor 2, subset information "0" may indicate a manner in which a phase factor 1 is fixed and a phase factor 2 is variable, and subset information "1" may indicate a manner in which the phase factor 2 is fixed and the phase factor 1 is variable. This improves flexibility of indicating the precoding matrix in the codebook.

Further, if the precoding matrix included in each precoding subset in the first codebook is determined based on the foregoing second alternative implementation, the first subset information may further indicate a value of a phase factor of a precoding subset corresponding to each subband in the first frequency band. For example, when the precoding matrix in the first codebook is determined based on a phase factor 1, a phase factor 2, a phase factor 3, and a phase factor 4, it is assumed that quantization factors corresponding to the phase factor 1, the phase factor 2, the phase factor 3, and the phase factor 4 are sequentially N1, N2, N3, and N4, if the phase factor 1, the phase factor 2, and the phase factor 3 are fixed and the phase factor 4 is variable, the first subset information may include a $\lceil \log_2(N_1) \rceil$ bit indicating a value of the phase factor 1, further include a $\lceil \log_2(N_2) \rceil$ bit indicating a value of the phase factor 2, and further include a $\lceil \log_2(N_3) \rceil$ bit indicating a value of the phase factor 3. Because the phase factor 4 is variable, that is, all possible values need to be traversed, the value of the phase factor 4 may not be indicated. The first subset information may indicate a value of a phase factor of the precoding subset. Optionally, a value of the quantization factor may be indicated by using the first signaling, or may be indicated by using other signaling such as radio resource control (RRC) signaling.

It should be understood that manners of determining the precoding matrices included in the precoding subset corresponding to each subband in the first frequency band may be the same or different. In a case of the differing manners, the first subset information includes subset indication information for each subband, indicating how to determine, for each subband, a precoding matrix included in each precoding subset in the first codebook.

In a third optional implementation, with reference to the first or the second optional implementation, the first signaling may further include transmission layer indication information, indicating a quantity of transmission layers.

In a fourth optional implementation, with reference to any one of the first to the third optional implementations, the first signaling may further include first subband information, and the first subband information indicates a size of each subband in the first frequency band. For example, the first subband information may indicate a subband size in a subband size set. For example, the subband size set may be {2, 4, 8, 16}. The first subband information may be indicated by using two bits, and different values of the two bits correspond to different values in the subband size set. For another example, the first subband information may indicate that the subband in the first frequency band includes L resource blocks, where L may be one of values such as 2, 4, 8, and 16. In another optional manner, the first subband information may also be indicated by using other signaling, for example, RRC signaling.

With reference to Table 4, for example, when the fourth optional implementation is combined with the third optional implementation, and manners of determining the precoding matrices included in the precoding subset corresponding to each subband in the first frequency band are the same, signaling content included in the first signaling is as follows:

TABLE 4

| Field | Function |
|---|---|
| First subband information | Indicating a size of each subband in a first frequency band |
| Transmission layer indication information | Indicating a quantity of transmission layers |
| First subset information | Indicating a method for determining a precoding matrix included in a precoding subset |
| Subset identifier corresponding to a subband 1 | Indicating a subset identifier of a precoding subset corresponding to the subband 1 in the first frequency band |
| Subset identifier corresponding to a subband 2 | Indicating a subset identifier of a precoding subset corresponding to the subband 2 in the first frequency band |
| . . . | . . . |
| Subset identifier corresponding to a subband M | Indicating a subset identifier of a precoding subset corresponding to the subband M in the first frequency band |

In an example of Table 4, the first frequency band includes M subbands, and the first indication information includes the subset identifier corresponding to the subband 1, the subset identifier corresponding to the subband 2, . . . , and the subset identifier corresponding to the subband M.

With reference to Table 5, for example, when the fourth optional implementation is combined with the third optional implementation, and manners of determining the precoding matrices included in the precoding subset corresponding to each subband in the first frequency band are different, signaling content included in the first signaling is as follows:

TABLE 5

| Field | Function |
|---|---|
| First subband information | Indicating a size of each subband in a first frequency band |
| Transmission layer indication information | Indicating a quantity of transmission layers |
| Subset information corresponding to a subband 1 | Indicating a method for determining a precoding matrix included in a precoding subset corresponding to the subband 1 |
| Subset information corresponding to a subband 2 | Indicating a method for determining a precoding matrix included in a precoding subset corresponding to the subband 2 |
| . . . | . . . |
| Subset information corresponding to a subband M | Indicating a method for determining a precoding matrix included in a precoding subset corresponding to the subband M |
| Subset identifier corresponding to the subband 1 | Indicating a subset identifier of the precoding subset corresponding to the subband 1 in the first frequency band |
| Subset identifier corresponding to the subband 2 | Indicating a subset identifier of the precoding subset corresponding to the subband 2 in the first frequency band |
| . . . | . . . |
| Subset identifier corresponding to the subband M | Indicating a subset identifier of the precoding subset corresponding to the subband M in the first frequency band |

In an example of Table 5, the first frequency band includes M subbands, the first indication information includes the subset identifier corresponding to the subband 1, the subset identifier corresponding to the subband 2, . . . , and the subset identifier corresponding to the subband M, and the first subset information includes the subset information corresponding to the subband 1, the subset information corresponding to the subband 2, . . . , and the subset information corresponding to the subband M.

In a fifth optional implementation, the first signaling may be DCI, and the first signaling indicates the first precoding subset for the first frequency band. For example, the network device may determine, with reference to an example corresponding to Formula (5), a precoding subset that matches the first frequency band, and then indicate, in the first signaling by using the first indication information, a subset identifier corresponding to the first frequency band.

In a sixth optional implementation, with reference to the fifth optional implementation, the first signaling may further include third subband information, and the third subband information may indicate a division manner of the subband in the first frequency band. For example, third subband information "0" indicates a subband division manner based on an activated BWP, or third subband information "1" indicates a subband division manner based on an actually allocated scheduled bandwidth. In another optional manner, the third subband information may also be indicated by using other signaling, for example, RRC signaling.

In a seventh optional implementation, with reference to the fifth or the sixth optional implementation, the first signaling may further include first subband information, and the first subband information indicates a size of each subband in the first frequency band. In another optional manner, the first subband information may also be indicated by using other signaling, for example, RRC signaling.

In an eighth optional implementation, with reference to any one of the fifth to the seventh optional implementations, the first signaling may further include second signaling indication information, the second signaling indication information indicates whether the second signaling exists at a current moment, and the second signaling is described in detail in step S202.

In a ninth optional implementation, with reference to any one of the fifth to the seventh optional implementations, the first signaling may further include first resource location information, and the first resource location information indicates a frequency domain resource and/or a time domain resource carrying the second signaling, for example, may indicate a frequency domain resource location offset (for example, an offset of a control channel element (CCE)) that carries the second signaling, or indicate a quantity of symbols occupied by the second signaling in time domain. A resource location of the second signaling is indicated, which reduces difficulty and a quantity of times of blind detection performed by the terminal device on the second signaling. The second signaling is described in detail in step S202.

It should be understood that the foregoing optional manners are merely examples of describing the first signaling. A form of the first signaling and the indication information carried in the first signaling may also be implemented in another manner. For example, when the first signaling is the MAC signaling, the first precoding subset may be indicated for the first frequency band, or when the first signaling is the DCI, the first precoding subset may be indicated for each subband in the first frequency band. Other implementations of the first signaling are not described herein.

S202: Send second signaling, where the second signaling carries second indication information, and the second indication information indicates a matrix identifier corresponding to a first precoding matrix in the first precoding subset.

Different precoding matrices in the first precoding subset correspond to different matrix identifiers, and the first precoding matrix is used to precode a PUSCH carried on the first subband.

In step S201, how to determine the precoding matrix included in each precoding subset in the first codebook is described. After the precoding matrix is determined, a matrix identifier may be set for the precoding matrix in each precoding subset, so that each precoding matrix in a same precoding subset has a different matrix identifier. Optionally, a matrix identifier may be an index of a precoding matrix. Herein, the index of the precoding matrix in the precoding subset may be different from the index of the precoding matrix in the first codebook in step S201. Because a quantity of precoding matrices in the precoding subset is less than a quantity of precoding matrices in the first codebook, indexes of the precoding matrices may be orchestrated in each precoding subset, to avoid a problem that an indication bit of the matrix identifier is excessively long because the indexes of the precoding matrices are jointly coded between precoding subsets or codebooks.

The first subband may be a subband in a second frequency band, and the second frequency band may be the same as the first frequency band, or may be a part of the first frequency band. For example, if the first frequency band is an activated BWP, the second frequency band may be an activated BWP, or may be a frequency domain resource currently allocated by the network device to the PUSCH of the terminal device. If the first frequency band is a frequency domain resource currently allocated by the terminal device to the PUSCH, the second frequency band may be a frequency domain resource currently allocated by the network device to the PUSCH of the terminal device.

After the network device determines the matched first precoding subset based on a channel status in step S201, the network device may determine a matched precoding matrix for each subband in the second frequency band. A specific determining manner varies. In a first case, it may depend on whether the second frequency band is the same as the first frequency band. In a second case, it may depend on whether the first precoding subset indicated by the first indication information in the first signaling is indicated for the first frequency band or indicated for the subband in the first frequency band. An example of determining the first precoding matrix that matches the first subband in the second frequency band is used for description in different cases.

In a first implementation, the first frequency band is an activated BWP, the second frequency band is a frequency domain resource (briefly referred to as a scheduled bandwidth) currently allocated by the network device to the PUSCH of the terminal device, and the first signaling indicates the first precoding subset for each subband in the first frequency band. In other words, the first precoding subset is a matched precoding subset determined for a subband in the first frequency band. A plurality of subbands included in the first frequency band are denoted as a plurality of third subbands, and a plurality of subbands included in the second frequency band are denoted as a plurality of fourth subbands (the first subband is one of the plurality of fourth subbands). In this case, each fourth subband has a corresponding third subband, and a frequency domain resource included in one fourth subband is a subset of frequency domain resources included in the third subband corresponding to the fourth subband. The network device may obtain a subset identifier (that is, a subset identifier of the first precoding subset) of a third subband corresponding to the first subband, select, from the precoding subset corresponding to the subset identifier, a precoding matrix that maximizes a channel capacity of the first subband, determine the precoding matrix as the first precoding matrix, and indicate the matrix identifier of the first precoding matrix in the first precoding subset by using the second indication information.

Figure 6:
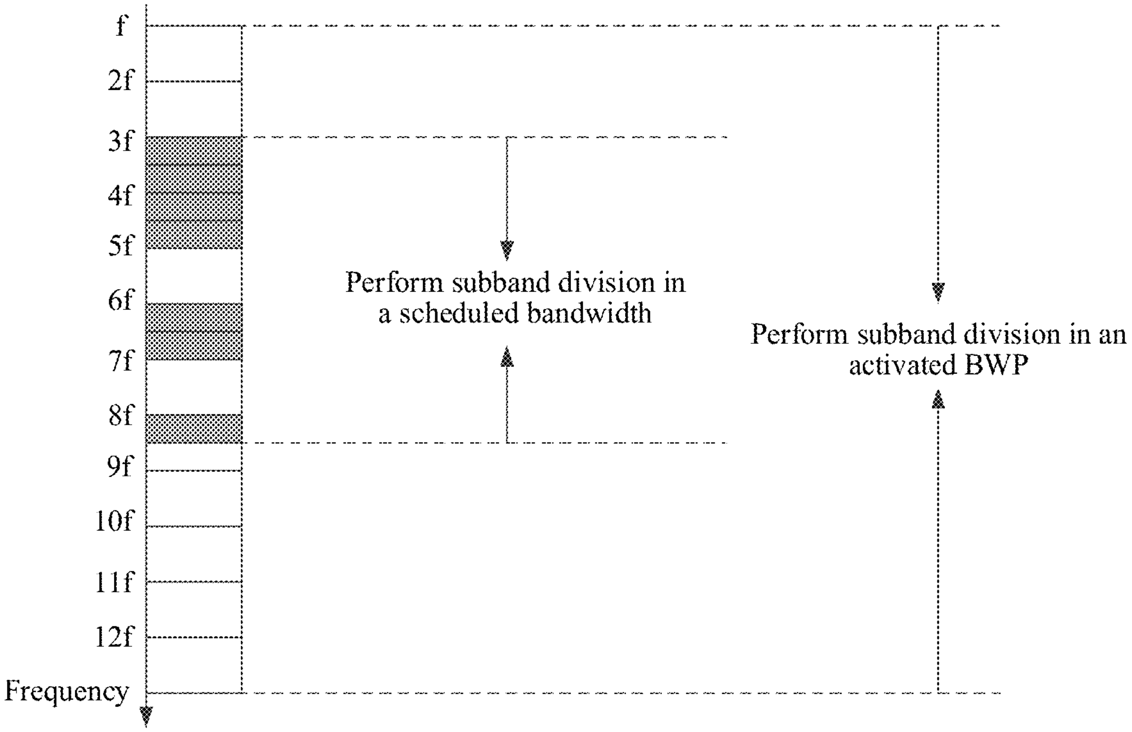
FIG. 6 is a schematic diagram of performing subband division based on a scheduled bandwidth according to an embodiment of this application.

An example of a relationship between an activated BWP and a scheduled bandwidth may be described by using FIG. 6. FIG. 6 is a schematic diagram of performing subband division based on a scheduled bandwidth according to an embodiment of this application. An activated BWP in FIG. 6 includes a frequency domain resource whose frequency ranges from f to 12f, and a size of a subband in the activated BWP may be f. A scheduled bandwidth in FIG. 6 is shown in a gray shadow block, and subband division may be performed again in the scheduled bandwidth. Subband division in the scheduled bandwidth starts from a first scheduled resource block. A size of a subband in the scheduled bandwidth in FIG. 6 is f/2. In this manner, although a subband granularity of the second frequency band is less than or equal to a subband granularity of the first frequency band, because the scheduled bandwidth is less than the activated BWP, a quantity of subbands in the second frequency band may be set to be less than a quantity of subbands in the first frequency band. In this way, a precoding matrix that matches a frequency domain resource can be indicated with a higher accuracy, and overheads of the second signaling can be reduced.

In a second implementation, the first frequency band and the second frequency band are a same frequency domain resource, and each are an activated BWP, or each are a frequency domain resource currently allocated by the network device to the PUSCH of the terminal device, and the first signaling indicates the first precoding subset for each subband in the first frequency band. In other words, the first precoding subset is a matched precoding subset determined for a subband in the first frequency band.

If a division manner of the subband in the first frequency band is the same as a division manner of the subband in the second frequency band, the subbands in the first frequency band are in a one-to-one correspondence with the subbands in the second frequency band, and the first subband is also a subband in the first frequency band. The network device may obtain a subset identifier (that is, a subset identifier of the first precoding subset) corresponding to the first subband, select, from the precoding subset corresponding to the subset identifier, a precoding matrix that maximizes a channel capacity of the first subband, determine the precoding matrix as the first precoding matrix, and indicate the matrix identifier of the first precoding matrix in the first precoding subset by using the second indication information.

A division manner of the subband in the first frequency band may be different from a division manner of the subband in the second frequency band. For a manner of determining the first precoding matrix in this case, refer to the manner of determining the first precoding matrix in the first implementation. Details are not described herein again.

In a third implementation, the first signaling indicates the first precoding subset for the first frequency band. In this case, the network device may obtain a subset identifier (that is, a subset identifier of the first precoding subset) corresponding to the first frequency band, select, from the precoding subset (that is, the first precoding subset) corresponding to the subset identifier, a precoding matrix that maximizes a channel capacity of the first subband, determine the precoding matrix as the first precoding matrix, and indicate the matrix identifier of the first precoding matrix in the first precoding subset by using the second indication information. Similarly, because the first signaling indicates the first precoding subset for the first frequency band, for another subband in the second frequency band, for example, a second subband, the network device may alternatively select a second precoding matrix corresponding to the second subband from the first precoding subset, and indicate a matrix identifier of the second precoding matrix in the first precoding subset by using the second indication information, where the second precoding matrix may be used to precode the PUSCH carried on the second subband.

In some other implementations, the second signaling may further carry other indication information in addition to the second indication information.

Optionally, the second signaling may further carry first time information, and the first time information indicates a first time. The first time may be a sending time of the first signaling, or the first time may be a sending time of specified historical signaling before the second signaling is sent, and the historical signaling carries indication information of a subset identifier corresponding to a precoding subset. For example, the first time may be a time at which the network device last sends, to the terminal device before the second signaling is sent, signaling that carries the indication information of the subset identifier. The first time information may indicate the terminal device to determine, based on first signaling or historical signaling sent by the network device at a first time, a precoding subset corresponding to a subband, and then determine, in the precoding subset, a precoding matrix indicated by the second indication information in the second signaling.

Optionally, the second signaling may further carry fourth subband information, and the fourth subband information indicates a division manner of the subband in the second frequency band. For example, fourth subband information "0" indicates a subband division manner based on an activated BWP, or fourth subband information "1" indicates a subband division manner based on an actually allocated scheduled bandwidth.

Optionally, the second signaling may further carry second subband information, and the second subband information indicates a size of each subband in the second frequency band. For example, the second subband information may indicate a subband size in a subband size set. For example, the subband size set may be {2, 4, 8, 16}. The second subband information may be indicated by using two bits, and different values of the two bits correspond to different values in the subband size set. For another example, the second subband information may indicate that the subband in the second frequency band includes K resource blocks, where K may be one of values such as 2, 4, 8, and 16.

With reference to Table 6, for example, the foregoing indication information that may be included in the second signaling is as follows:

TABLE 6

| Indication information name | Description |
|---|---|
| Fourth subband information | One bit indicates a division manner of a subband in a second frequency band. If this field does not exist, a subband division manner based on an activated BWP is used by default. |
| Second subband information | Indicating a size of each subband in a second frequency band If the field does not exist, a size of a subband in a first frequency band is used by default. |
| First time information | Indicating a sending time of first signaling or specified historical signaling, which may be a time offset timeslot. |
| Matrix identifier corresponding to a subband 1 | Indicating a matrix identifier of a precoding matrix corresponding to the subband 1 in the second frequency band |
| Matrix identifier corresponding to a subband 2 | Indicating a matrix identifier of a precoding matrix corresponding to the subband 2 in the second frequency band |
| . . . | . . . |
| Matrix identifier corresponding to a subband M | Indicating a matrix identifier of a precoding matrix corresponding to the subband M in the second frequency band |

Optionally, the second signaling may further carry signaling identification information, and the signaling identification information indicates that the second signaling is signaling indicating a matrix identifier of a precoding matrix corresponding to each subband in the second frequency band. When both the first signaling and the second signaling are DCI, the signaling identification information may enable the terminal device to distinguish between the first signaling and the second signaling when detecting the DCI.

The foregoing describes the indication information that may be carried in the second signaling and that is related to a PUSCH precoding matrix. It should be understood that the second signaling may further carry other indication information that is not related to the PUSCH precoding matrix, for example, a modulation and coding index. This is not limited herein.

Step S202 is performed after step S201, or may be simultaneously performed with step S201. For example, when the first signaling is DCI or MAC signaling, the first signaling may be sent before the second signaling. When the first signaling is DCI, the first signaling and the second signaling may be simultaneously sent.

Optionally, the method further includes S203 and S204.

S203: Determine the first precoding matrix based on the first signaling and the second signaling.

After step S201, the terminal device may receive the first signaling. After step S202, the terminal device may receive the second signaling. After receiving the first signaling and the second signaling, the terminal device may determine the first codebook based on a quantity of configured transmission layers and a quantity of used antenna ports, obtain the first precoding subset in the first codebook based on a subset identifier indicated by the first indication information in the first signaling, and obtain the first precoding matrix from the first precoding subset based on a matrix identifier indicated by the second indication information in the second signaling.

If the first indication information in the first signaling indicates a subset identifier for the first frequency band, the terminal device may determine, based on the matrix identifier indicated by the second indication information in the second signaling for the first subband, the precoding matrix corresponding to the matrix identifier from the precoding subset corresponding to the subset identifier, that is, the first precoding matrix.

If the first indication information in the first signaling indicates the subset identifier for each subband in the first frequency band, the terminal device needs to first determine the subset identifier corresponding to the first subband, and then determine, from the precoding subset corresponding to the subset identifier, the precoding matrix corresponding to the matrix identifier indicated by the second indication information, that is, the first precoding matrix. The terminal device determines, in different implementations, the subset identifier corresponding to the first subband.

In a first implementation, when the first frequency band and the second frequency band are the same, and sizes of the subbands in the first frequency band and the second frequency band are the same, the subbands in the first frequency band are in a one-to-one correspondence with the subbands in the second frequency band, and the first subband is also a subband in the first frequency band. The terminal device may obtain the subset identifier corresponding to the first subband indicated in the first indication information.

In a second implementation, when the first frequency band is an activated BWP (a plurality of subbands included in the first frequency band are denoted as a plurality of third subbands), and the second frequency band is a currently actually scheduled bandwidth, or when the first frequency band and the second frequency band are the same, but sizes of the subbands in the first frequency band and the second frequency band are different, because the first subband includes at least one resource block, each third subband includes at least one resource block, and each resource block has a unique corresponding resource block identifier (for example, an RB index), the terminal device may determine a target third subband from the plurality of third subbands based on a resource block identifier of the resource block included in the first subband, where a resource block of the target third subband includes all resource blocks in the first subband, and the terminal device uses a subset identifier that corresponds to the target third subband and that is indicated by the first indication information as the subset identifier corresponding to the first subband.

S204: Precode, based on the first precoding matrix, the PUSCH carried on the first subband, and send a precoded PUSCH.

In some embodiments, the network device sends the first signaling and the second signaling to the terminal device, indicates the subset identifier corresponding to the first precoding subset in the first codebook by using the first indication information carried in the first signaling, and indicates the matrix identifier of the first precoding matrix in the first precoding subset by using the second indication information carried in the second signaling. In this way, a precoding matrix for precoding the PUSCH carried on the first subband is indicated by using two levels of signaling, so that flexibility of indicating the precoding matrix for the subband is improved, and low signaling overheads can be achieved while system performance is ensured.

Figure 7:
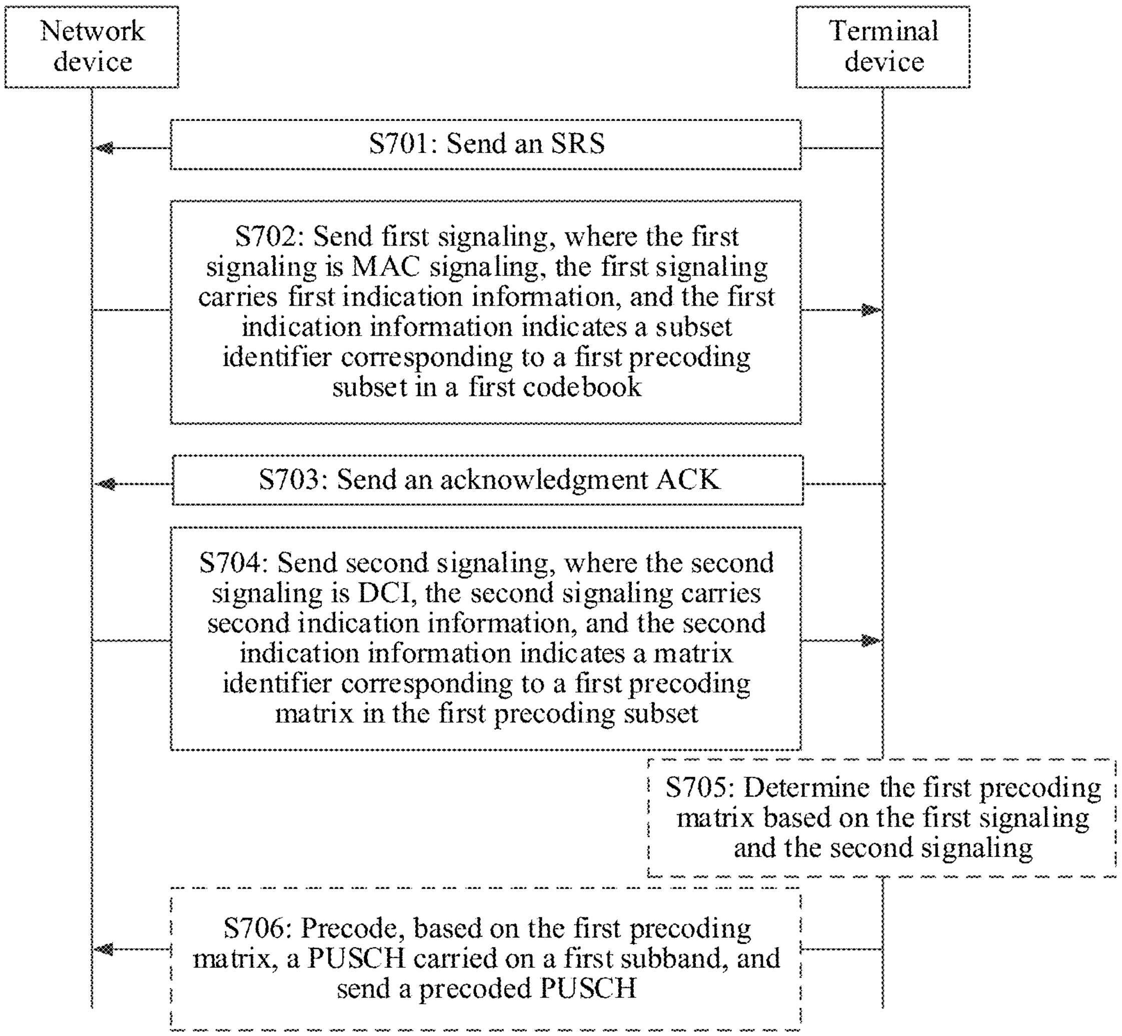
FIG. 7 is a schematic flowchart of another information transmission method according to an embodiment of this application.

FIG. 7 is a schematic flowchart of another information transmission method according to an embodiment of this application. The method may be applied to the communication system shown in FIG. 1. As shown in FIG. 7, the method may include steps S701 to S706.

S701: Send a sounding reference signal (SRS).

Optionally, an SRS sent by a terminal device may be one of a periodic SRS, an aperiodic SRS, or a semi-persistent SRS.

S702: Send first signaling, where the first signaling is MAC signaling, the first signaling carries first indication information, and the first indication information indicates a subset identifier corresponding to a first precoding subset in a first codebook.

The first codebook includes a plurality of precoding subsets, each precoding subset includes a plurality of precoding matrices, and different precoding subsets in the first codebook correspond to different subset identifiers.

After receiving the SRS, a network device may measure uplink channel state information (CSI) based on the SRS, determine, based on the uplink CSI, a first precoding subset corresponding to a first subband in a first frequency band, and indicate a subset identifier of the first precoding subset by using the first indication information. For an implementation of determining, based on the uplink CSI, the first precoding subset corresponding to the first subband in the first frequency band, refer to related descriptions of selecting a matched precoding matrix according to a capacity maximization criterion of the subband in step S201 in the embodiments corresponding to FIG. 2. Details are not described herein again.

The first frequency band may be an activated BWP of the terminal device, or a frequency domain resource currently allocated by the network device to the terminal device. For division into subbands in the first frequency band, refer to a subband division manner in step S201 in the embodiments corresponding to FIG. 2. Details are not described herein again.

The first signaling is MAC signaling. For an indication form of the first signaling and signaling content included in the first signaling, refer to related descriptions that the first signaling is the MAC signaling in step S201 in the embodiments corresponding to FIG. 2. Details are not described herein again.

S703: Send an acknowledgment (ACK).

After receiving the first signaling, the terminal device may check the first signaling, for example, check the first signaling through cyclic redundancy check (CRC). When the check succeeds, the terminal device performs S703 to send the ACK. When the check fails, the terminal device returns a negative acknowledgment (NACK) to the network device.

S704: Send second signaling, where the second signaling is DCI, the second signaling carries second indication information, and the second indication information indicates a matrix identifier corresponding to a first precoding matrix in the first precoding subset.

Different precoding matrices in the first precoding subset correspond to different matrix identifiers, and the first precoding matrix is used to precode a PUSCH carried on the first subband.

The second signaling is DCI. For an indication form of the second signaling and signaling content included in the second signaling, refer to related descriptions of the second signaling in step S202 in the embodiments corresponding to FIG. 2. Details are not described herein again.

After receiving the ACK, the network device performs S704. If the network device receives the NACK, the network device may have different execution manners. In one manner, the network device may switch to an indication manner of a broadband indication transmitted precoding matrix indicator (TPMI) to indicate the precoding matrix. In another manner, the network device may use the second signaling to carry first time information, and indicate a sending time of the target first signaling by using the first time information, where the target first signaling is first signaling that corresponds to an ACK, that is sent by the terminal device, and that is last received by the network device (that is, signaling that carries a subset identifier of a precoding subset and that is last acknowledged by the terminal device as received). Therefore, the network device may determine, from a precoding subset corresponding to a first subband indicated in the target first signaling, a precoding matrix that matches the first subband, indicate a matrix identifier of the precoding matrix by using the second signaling, and send the second signaling to the terminal device. The first time information may be an offset between the sending time of the target first signaling and a sending time of the second signaling, so that after receiving the second signaling, the terminal device may obtain the target first signaling based on the offset, and determine the first precoding matrix based on the target first signaling and the second signaling.

S705: Determine a first precoding matrix based on the first signaling and the second signaling.

For a manner in which the terminal device determines the first precoding matrix based on the first signaling and the second signaling, refer to related descriptions of step S203 in the embodiment corresponding to FIG. 2. Details are not described herein again.

S706: Precode, based on the first precoding matrix, the PUSCH carried on the first subband, and send a precoded PUSCH.

In some embodiments, a precoding matrix for precoding the PUSCH carried on the first subband is indicated by using the two levels of signaling, that is, the first signaling and the second signaling. When the first signaling is MAC signaling, DCI overheads are reduced, and when bits included in the second signaling are reduced, DCI detection reliability of the terminal device is improved, and DCI detection complexity of the terminal device is reduced.

Figure 8:
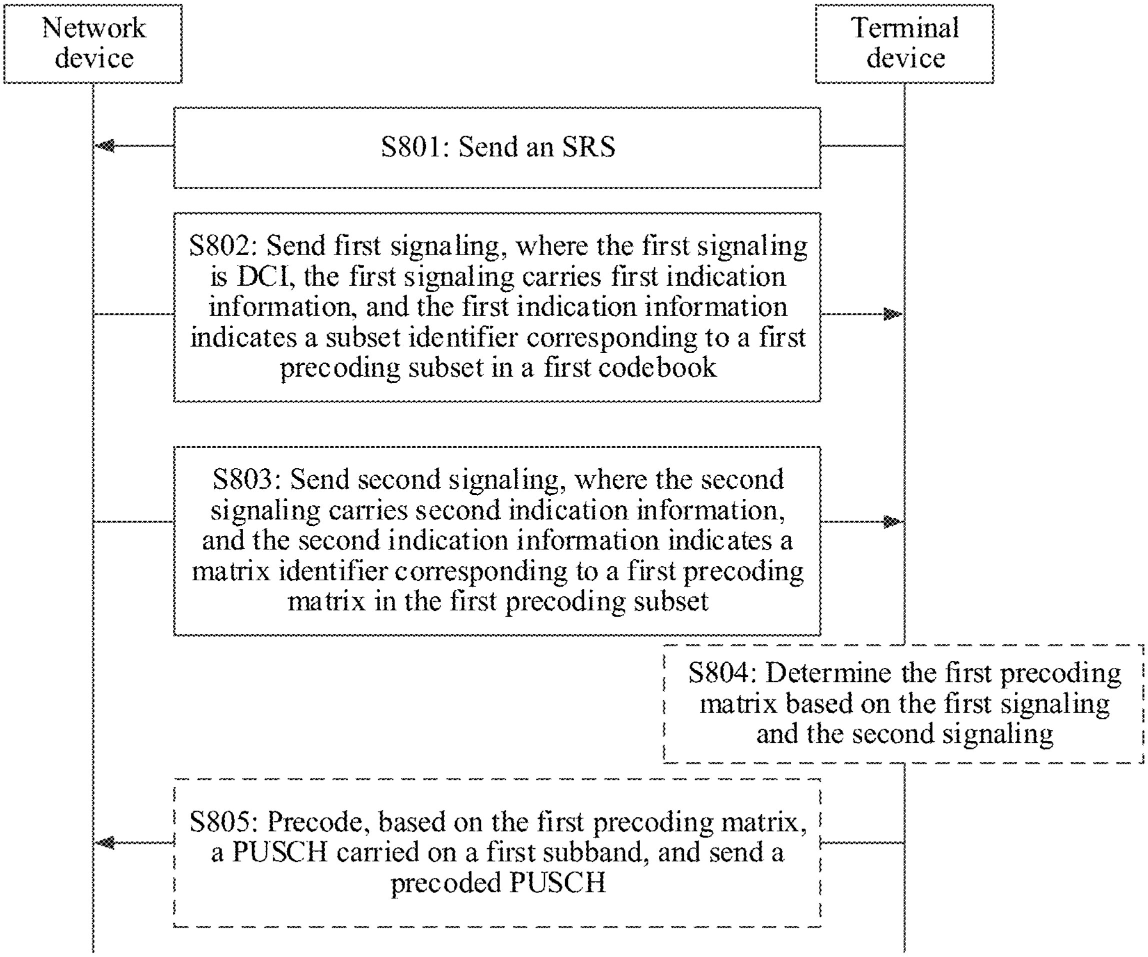
FIG. 8 is a schematic flowchart of another information transmission method according to an embodiment of this application.

FIG. 8 is a schematic flowchart of another information transmission method according to an embodiment of this application. The method may be applied to the communication system shown in FIG. 1. As shown in FIG. 8, the method may include steps S801 to S805.

S801: Send an SRS.

Optionally, an SRS sent by a terminal device may be one of a periodic SRS, an aperiodic SRS, or a semi-persistent SRS.

S802: Send first signaling, where the first signaling is DCI, the first signaling carries first indication information, and the first indication information indicates a subset identifier corresponding to a first precoding subset in a first codebook.

The first codebook includes a plurality of precoding subsets, each precoding subset includes a plurality of precoding matrices, and different precoding subsets in the first codebook correspond to different subset identifiers.

After receiving the SRS, a network device may measure uplink CSI based on the SRS, determine, based on the uplink CSI, a first precoding subset corresponding to a first subband in a first frequency band, and indicate a subset identifier of the first precoding subset by using the first indication information. For an implementation of determining, based on the uplink CSI, the first precoding subset corresponding to the first subband in the first frequency band, refer to related descriptions of selecting a matched precoding matrix according to a capacity maximization criterion of the subband in step S201 in the embodiment corresponding to FIG. 2. Details are not described herein again.

The first frequency band may be an activated BWP of the terminal device, or a frequency domain resource currently allocated by the network device to the terminal device. For division into subbands in the first frequency band, refer to a subband division manner in step S201 in the embodiments corresponding to FIG. 2. Details are not described herein again.

The first signaling is DCI. For a specific indication form of the first signaling and signaling content included in the first signaling, refer to related descriptions that the first signaling is the DCI in step S201 in the embodiments corresponding to FIG. 2. Details are not described herein again.

S803: Send second signaling, where the second signaling carries second indication information, and the second indication information indicates a matrix identifier corresponding to a first precoding matrix in the first precoding subset.

Different precoding matrices in the first precoding subset correspond to different matrix identifiers, and the first precoding matrix is used to precode a PUSCH carried on the first subband.

The second signaling is DCI. For a specific indication form of the second signaling and signaling content included in the second signaling, refer to related descriptions of the second signaling in step S202 in the embodiments corresponding to FIG. 2. Details are not described herein again.

Step S803 may be performed after step S802, or may be simultaneously performed with step S802. When step S803 is performed after S802, in a process of indicating the precoding matrix for a plurality of times, if information in the first signaling remains unchanged, S802 may not be repeatedly performed, and only S803 is performed to indicate a re-determined matrix identifier. If the terminal device detects only the second signaling, all or some of information in the last received first signaling may be reused.

S804: Determine the first precoding matrix based on the first signaling and the second signaling.

For a manner in which the terminal device determines the first precoding matrix based on the first signaling and the second signaling, refer to related descriptions of step S203 in the embodiment corresponding to FIG. 2. Details are not described herein again.

S805: Precode, based on the first precoding matrix, the PUSCH carried on the first subband, and send a precoded PUSCH.

In some embodiments, a precoding matrix for precoding the PUSCH carried on the first subband is indicated by using the two levels of signaling, that is, the first signaling and the second signaling. When both the first signaling and the second signaling are DCI, a time limit for indicating the precoding matrix to the terminal device can be reduced, and a channel whose status changes can be quickly matched. Compared with a manner of using the DCI for indication, which may further reduce more overheads.

Figure 9:
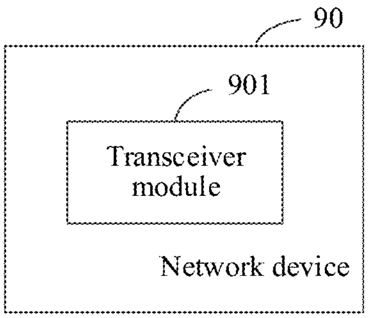
FIG. 9 is a schematic diagram of a structure of a network device according to an embodiment of this application.

The following describes related devices provided in embodiments of this application. First, FIG. 9 is a schematic diagram of a structure of a network device according to an embodiment of this application. As shown in FIG. 9, the network device 90 may include at least a transceiver module 901.

The transceiver module 901 is configured to send first signaling, where the first signaling carries first indication information, the first indication information indicates a subset identifier corresponding to a first precoding subset in a first codebook, the first codebook includes a plurality of precoding subsets, each precoding subset includes a plurality of precoding matrices, and different precoding subsets correspond to different subset identifiers.

The transceiver module 901 is further configured to send second signaling, where the second signaling carries second indication information, the second indication information indicates a matrix identifier corresponding to a first precoding matrix in the first precoding subset, different precoding matrices in the first precoding subset correspond to different matrix identifiers, and the first precoding matrix is used to precode a PUSCH carried on a first subband.

In an optional manner, the second indication information further indicates a matrix identifier corresponding to a second precoding matrix in the first precoding subset, the second precoding matrix is used to precode a PUSCH carried on a second subband, and the second subband and the first subband are different frequency domain resources in a same frequency band.

In an optional manner, a first frequency band includes a plurality of third subbands, a second frequency band includes a plurality of fourth subbands, the first subband is one of the plurality of fourth subbands, and a frequency domain resource included in one fourth subband is a subset of frequency domain resources included in one third subband; and the first indication information indicates a subset identifier of a precoding subset corresponding to each third subband, and the second indication information indicates a matrix identifier of a precoding matrix corresponding to each fourth subband.

In an optional manner, the first indication information indicates a subset identifier of a precoding subset corresponding to each subband in a first frequency band, the second indication information indicates a matrix identifier of a precoding matrix corresponding to each subband in the first frequency band, and the first subband is a subband in the first frequency band.

In an optional manner, the first frequency band is an activated BWP of a terminal device, and the second frequency band is a frequency domain resource currently allocated by the network device to a PUSCH of the terminal device.

In an optional manner, the first signaling further carries first subset information, and the first subset information is used to determine a plurality of precoding matrices in the first precoding subset.

In an optional manner, when the first signaling is DCI, the first signaling further carries first resource location information, and the first resource location information indicates a frequency domain resource and/or a time domain resource carrying the second signaling.

In an optional manner, the precoding matrix in the first codebook is determined based on a first phase factor and a second phase factor, and the first phase factor and the second phase factor each have at least two different values; and precoding matrices in a same precoding subset are determined based on a same value of the first phase factor and different values of the second phase factor.

In an optional manner, the first signaling is MAC signaling or DCI, and the second signaling is DCI.

It may be understood that, the network device 90 in some embodiments may implement the steps performed by the network device in the embodiments corresponding to FIG. 2, FIG. 7, or FIG. 8, for example, step S201 or S202. For implementations of the functional components included in the network device in FIG. 9 and corresponding beneficial effects, refer to detailed descriptions of the embodiments in FIG. 2, FIG. 7, or FIG. 8.

Figure 10:
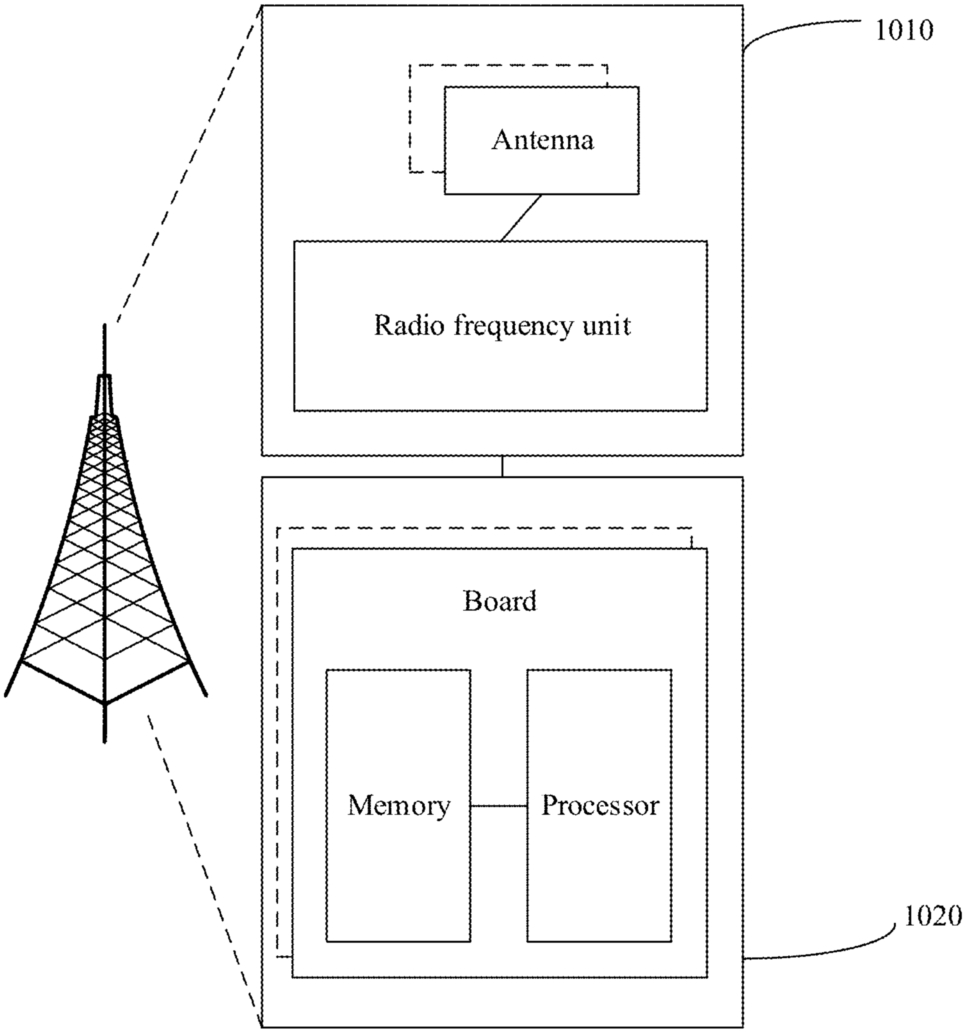
FIG. 10 is a schematic diagram of a structure of a communication apparatus according to an embodiment of this application.

FIG. 10 is a schematic diagram of a structure of a communication apparatus according to an embodiment of this application. The communication apparatus may be configured to perform a function of the network device corresponding to FIG. 9. The apparatus may be the network device, or may be an element or a module (such as a circuit or a chip) inside the network device. The apparatus may include one or more transceiver units 1010 and one or more processing units 1020. The transceiver unit 1010 may be referred to as a transceiver machine, a transceiver circuit, a transceiver, or the like, and may include at least one antenna and radio frequency unit. The transceiver unit 1010 is configured to: receive and send a radio frequency signal, and perform conversion between a radio frequency signal and a baseband signal, for example, configured to send the first signaling or the second signaling in the foregoing embodiments to a terminal device. The processing unit 1020 is configured to: perform baseband processing, control the apparatus, and the like. The transceiver unit 1010 and the processing unit 1020 may be physically disposed (e.g., integrated) together, or may be physically disposed separately. To be specific, the apparatus is a distributed apparatus. For example, the processing unit 1020 may be configured to control the apparatus to perform a process of determining a precoding subset or a precoding matrix in the foregoing embodiment. In an implementation, the processing unit 1020 may include one or more boards. A plurality of boards may jointly support a radio access network (for example, an NR network) of a single access standard, or may support radio access networks of different access standards. The processing unit 1020 further includes a memory and a processor. The memory is configured to store necessary instructions and data. The processor is configured to control the apparatus to perform a necessary action, for example, configured to control the apparatus to perform an operation procedure related to the apparatus in the foregoing method embodiments. The memory and the processor may serve one or more boards. In other words, a memory and a processor may be deployed on each board. Alternatively, a plurality of boards may share a same memory and a same processor. In addition, a necessary circuit may be further disposed on each board.

In an optional implementation, the processor may include a baseband processor and/or a central processing unit (CPU). The baseband processor is configured to process a communication protocol and communication data. The central processing unit is configured to: control the apparatus, execute a software program, and process data of the software program. Functions of the baseband processor and the central processing unit may be integrated into the processor in FIG. 10. A person skilled in the art may understand that the baseband processor and the central processing unit each may be an independent processor, and are connected by using an interconnection technology. A person skilled in the art may understand that, the apparatus may include a plurality of baseband processors to adapt to different network standards, the apparatus may include a plurality of central processing units to enhance a processing capability of the apparatus, and components of the apparatus may be interconnected. The baseband processor may alternatively be expressed as a baseband processing circuit or a baseband processing chip. The central processing unit may alternatively be expressed as a central processing circuit or a central processing chip. A function of processing the communication protocol and the communication data may be embedded in the processor, or may be stored in a storage unit in a form of the software program. The processor executes the software program to implement a baseband processing function.

Figure 11:
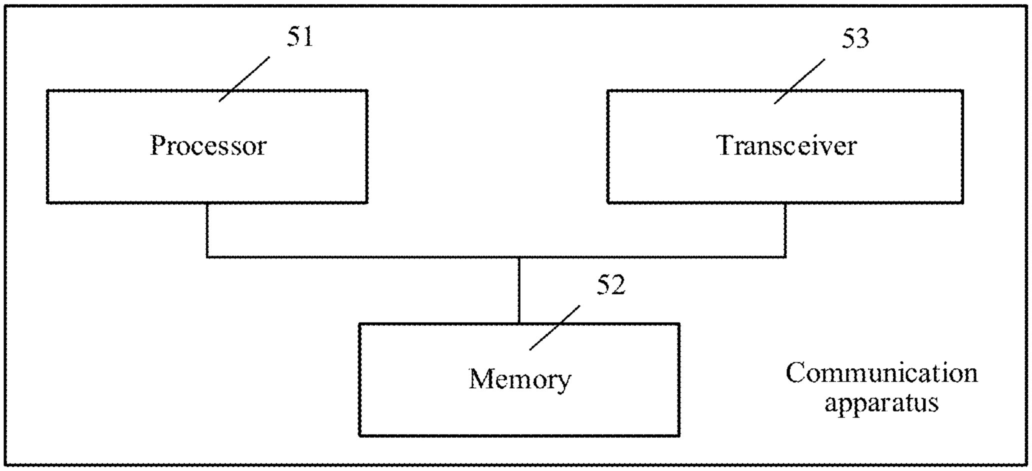
FIG. 11 is another schematic diagram of a structure of a communication apparatus according to an embodiment of this application.

FIG. 11 is another schematic diagram of a structure of a communication apparatus according to an embodiment of this application. The communication apparatus may be the network device in FIG. 9 or FIG. 10, and may be configured to implement the method implemented by the network device in the embodiments corresponding to FIG. 2, FIG. 7, or FIG. 8. The apparatus includes a processor 51, a memory 52, and a transceiver 53.

The memory 52 includes but is not limited to a random access memory (RAM), a read-only memory (ROM), an erasable programmable ROM (EPROM), or a compact disc (CD)-ROM. The memory 52 is configured to store related instructions and data. The memory 52 stores the following elements, an executable module or a data structure, a subset thereof, or an extended set thereof: operation instructions, including various operation instructions and used to implement various operations; and an operating system, including various system programs and configured to implement various basic services and process a hardware-based task.

Only one memory is shown in FIG. 5. Certainly, a plurality of memories may be disposed based on a requirement.

The transceiver 53 may be a communication module or a transceiver circuit. In some embodiments, the transceiver 53 is configured to perform a process of sending the first signaling or the second signaling in the embodiments corresponding to FIG. 2, FIG. 7, or FIG. 8.

The processor 51 may be a controller, a CPU, a general-purpose processor, a digital signal processor (DSP), an application-specific integrated circuits (ASIC), a field programmable gate arrays (FPGA) or another programmable logic device, a transistor logic device, a hardware component, or any combination thereof. The processor may implement or execute various example logical blocks, modules, and circuits described with reference to content disclosed in embodiments of this application, for example, a process of determining a precoding subset or a precoding matrix that matches the first subband in the embodiment corresponding to FIG. 2, FIG. 7, or FIG. 8. Alternatively, the processor 51 may be a combination of processors implementing a computing function, for example, a combination of one or more microprocessors or a combination of a DSP and a microprocessor.

It should be noted that, during actual application, the processor in some embodiments may be an integrated circuit chip, and has a signal processing capability. In an implementation process, steps in the foregoing method embodiments may be implemented by using a hardware integrated logic circuit in the processor, or by using instructions in a form of software. The processor may be a general-purpose processor, a DSP, an ASIC, an FPGA or another programmable logic device, a discrete gate or transistor logic device, or a discrete hardware component. The processor may implement or perform the methods, steps, and logical block diagrams that are disclosed in embodiments of this application.

It may be understood that the memory in embodiments of this application may be a volatile memory or a nonvolatile memory, or may include a volatile memory and a nonvolatile memory. The nonvolatile memory may be a ROM, a programmable read-only memory (PROM), an erasable programmable read-only memory (EPROM), an electrically erasable programmable read-only memory (EEPROM), or a flash memory. The volatile memory may be a RAM and is used as an external cache. By way of example but not limitation, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory described in embodiments of this application aims to include but is not limited to these memories and any memory of another proper type.

Figure 12:
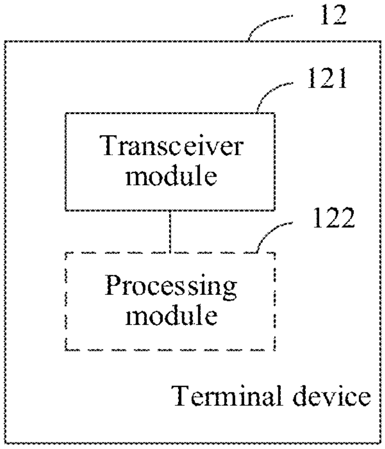
FIG. 12 is a schematic diagram of a structure of a terminal device according to an embodiment of this application.

FIG. 12 is a schematic diagram of a structure of a terminal device according to an embodiment of this application. As shown in FIG. 12, the terminal device 12 may include at least a transceiver module 121, and optionally, may further include a processing module 122.

The transceiver module 121 is configured to receive first signaling, where the first signaling carries first indication information, the first indication information indicates a subset identifier corresponding to a first precoding subset in a first codebook, the first codebook includes a plurality of precoding subsets, each precoding subset includes a plurality of precoding matrices, and different precoding subsets correspond to different subset identifiers.

The transceiver module 121 is further configured to receive a second instruction, where the second signaling carries second indication information, the second indication information indicates a matrix identifier corresponding to a first precoding matrix in the first precoding subset, different precoding matrices in the first precoding subset correspond to different matrix identifiers, and the first precoding matrix is used to precode a PUSCH carried on a first subband.

In an optional manner, the second indication information further indicates a matrix identifier corresponding to a second precoding matrix in the first precoding subset, the second precoding matrix is used to precode a PUSCH carried on a second subband, and the second subband and the first subband are different frequency domain resources in a same frequency band.

In an optional manner, a first frequency band includes a plurality of third subbands, a second frequency band includes a plurality of fourth subbands, the first subband is one of the fourth subbands, and a frequency domain resource included in one fourth subband is a subset of frequency domain resources included in one third subband; and the first indication information indicates a subset identifier of a precoding subset corresponding to each third subband, and the second indication information indicates a matrix identifier of a precoding matrix corresponding to each fourth subband.

In an optional manner, the first indication information indicates a subset identifier of a precoding subset corresponding to each subband in a first frequency band, the second indication information indicates a matrix identifier of a precoding matrix corresponding to each subband in the first frequency band, and the first subband is a subband in the first frequency band.

In an optional manner, the first subband includes at least one resource block, and each third subband includes at least one resource block; and the processing module 122 is configured to: determine a target third subband from the plurality of third subbands based on a resource block identifier of a resource block included in the first subband, where a resource block in the target third subband includes each resource block in the first subband; obtain the first precoding subset based on a subset identifier corresponding to the target third subband; and obtain the first precoding matrix from the first precoding subset based on a matrix identifier corresponding to the first subband.

In an optional manner, the first frequency band is an activated BWP of the terminal device, and the second frequency band is a frequency domain resource currently allocated by a network device to a PUSCH of the terminal device.

In an optional manner, the first signaling further carries first subset information, and the first subset information is used to determine a plurality of precoding matrices in the first precoding subset.

In an optional manner, when the first signaling is DCI, the first signaling further carries first resource location information, and the first resource location information indicates a frequency domain resource and/or a time domain resource carrying the second signaling.

In an optional manner, the precoding matrix in the first codebook is determined based on a first phase factor and a second phase factor, and the first phase factor and the second phase factor each have at least two different values; and precoding matrices in a same precoding subset are determined based on a same value of the first phase factor and different values of the second phase factor.

In an optional manner, the first signaling is MAC signaling or DCI, and the second signaling is DCI.

It may be understood that the terminal device in some embodiments may implement the steps performed by the terminal device in the embodiment corresponding to FIG. 2, FIG. 7, or FIG. 8, for example, receive the first signaling or receive the second signaling, or perform step S203 or S204. For implementations of the functional components included in the terminal device in FIG. 12 and corresponding beneficial effects, refer to detailed descriptions of the embodiment in FIG. 2, FIG. 7, or FIG. 8.

Figure 13:
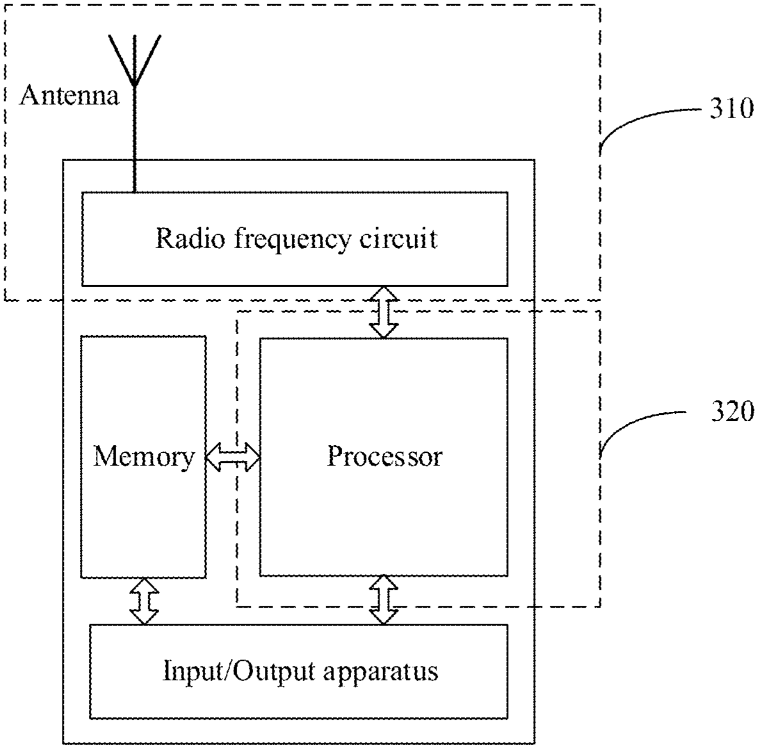
FIG. 13 is another schematic diagram of a structure of a communication apparatus according to an embodiment of this application.

FIG. 13 is another schematic diagram of a structure of a communication apparatus according to an embodiment of this application. The communication apparatus may be configured to perform a function of the terminal device corresponding to FIG. 12. The apparatus may be the terminal device, or may be an element or a module inside the terminal device. For ease of description, FIG. 13 shows only main components of the communication apparatus. It can be learned from FIG. 13 that the communication apparatus includes a processor, a memory, a radio frequency circuit, an antenna, and an input/output apparatus. The processor is configured to: process a communication protocol and communication data, control the apparatus, execute a software program, process data of the software program, and the like. The memory is configured to store a software program and data. The radio frequency circuit is configured to: perform conversion between a baseband signal and a radio frequency signal, and process the radio frequency signal. The antenna is configured to: receive and send a radio frequency signal in a form of an electromagnetic wave. The input/output apparatus, for example, a touchscreen, a display, or a keyboard, is configured to receive data input by a user using the apparatus, and output data to the user. It should be noted that, in some scenarios, the communication apparatus may not include the input/output apparatus.

When data needs to be sent, the processor performs baseband processing on the to-be-sent data, and then outputs a baseband signal to the radio frequency circuit. The radio frequency circuit performs radio frequency processing on the baseband signal and then sends a radio frequency signal to the outside in a form of an electromagnetic wave through the antenna. When data is sent to the apparatus, the radio frequency circuit receives a radio frequency signal through the antenna, converts the radio frequency signal into a baseband signal, and outputs the baseband signal to the processor; and the processor converts the baseband signal into data and processes the data. For ease of description, only one memory and processor are shown in FIG. 13. In an actual apparatus product, there may be one or more processors and one or more memories. The memory may also be referred to as a storage medium, a storage device, or the like. The memory may be disposed independent of the processor, or may be integrated with the processor. This is not limited in some embodiments.

In an optional implementation, the processor may include a baseband processor and/or a central processing unit. The baseband processor is configured to process a communication protocol and communication data. The central processing unit is configured to control the apparatus, execute a software program, and process data of the software program. Functions of the baseband processor and the central processing unit may be integrated into the processor in FIG. 13. A person skilled in the art may understand that the baseband processor and the central processing unit each may be an independent processor, and are connected by using an interconnection technology. A person skilled in the art may understand that, the apparatus may include a plurality of baseband processors to adapt to different network standards, the apparatus may include a plurality of central processing units to enhance a processing capability of the apparatus, and components of the apparatus may be interconnected. The baseband processor may alternatively be expressed as a baseband processing circuit or a baseband processing chip. The central processing unit may alternatively be expressed as a central processing circuit or a central processing chip. A function of processing the communication protocol and the communication data may be embedded in the processor, or may be stored in a storage unit in a form of the software program. The processor executes the software program to implement a baseband processing function.

In some embodiments, the antenna and the radio frequency circuit that have a transceiver function may be considered as a transceiver unit of the apparatus, and the processor that has a processing function may be considered as a processing unit of the apparatus. As shown in FIG. 13, the communication apparatus includes a transceiver unit 310 (e.g., transceiver circuit) and a processing unit 320 (e.g., processing circuit). Optionally, a component that is in the transceiver unit 310 and that is configured to implement a receiving function may be considered as a receiving unit (e.g., receiving circuit), and a component that is in the transceiver unit 310 and that is configured to implement a sending function may be considered as a sending unit (e.g., sending circuit). That is, the transceiver unit 310 includes the receiving unit and the sending unit. The receiving unit herein sometimes may also be referred to as a receiver machine, a receiver, a receiver circuit, or the like. The sending unit sometimes may also be referred to as a transmitter machine, a transmitter, a transmitter circuit, or the like.

It should be understood that the transceiver unit 310 may be configured to perform the step of receiving the first signaling or receiving the second signaling in the embodiment corresponding to FIG. 2, FIG. 7, or FIG. 8. The processing unit 320 may be configured to perform the step of determining the first precoding matrix based on the first signaling and the second signaling.

Figure 14:
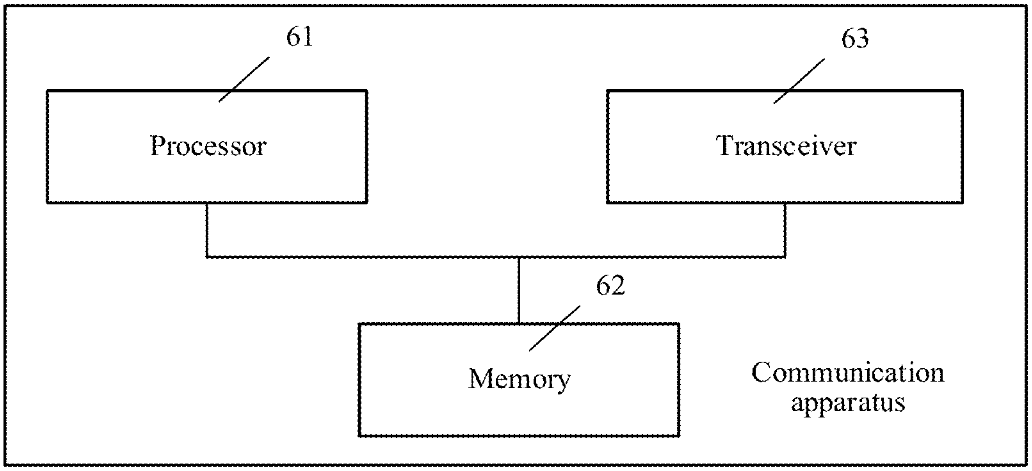
FIG. 14 is another schematic diagram of a structure of a communication apparatus according to an embodiment of this application.

FIG. 14 is another schematic diagram of a structure of a communication apparatus according to an embodiment of this application. The communication apparatus may be the terminal device in FIG. 12 or FIG. 13, and may be configured to implement the method implemented by the terminal device in the embodiments corresponding to FIG. 2, FIG. 7, or FIG. 8. The apparatus includes a processor 61, a memory 62, and a transceiver 63.

The memory 62 includes but is not limited to a RAM, a ROM, an EPROM, or a CD-ROM. The memory 62 is configured to store related instructions and data. The memory 62 stores the following elements, an executable module or a data structure, a subset thereof, or an extended set thereof: operation instructions, including various operation instructions and used to implement various operations; and an operating system, including various system programs and configured to implement various basic services and process a hardware-based task.

Only one memory is shown in FIG. 14. Certainly, a plurality of memories may alternatively be disposed based on a requirement.

The transceiver 63 may be a communication module or a transceiver circuit. In some embodiments, the transceiver 63 is configured to perform a process of receiving the first signaling or the second signaling in the embodiment corresponding to FIG. 2, FIG. 7, or FIG. 8.

The processor 61 may be a controller, a CPU, a general-purpose processor, a DSP, an ASIC, an FPGA or another programmable logic device, a transistor logic device, a hardware component, or any combination thereof. The processor may implement or execute various example logical blocks, modules, and circuits described with reference to content disclosed in embodiments of this application, for example, a process of determining the first precoding matrix based on the first signaling and the second signaling in the embodiment corresponding to FIG. 2, FIG. 7, or FIG. 8. Alternatively, the processor 61 may be a combination of processors implementing a computing function, for example, a combination of one or more microprocessors or a combination of a DSP and a microprocessor.

It should be noted that, during actual application, the processor in some embodiments may be an integrated circuit chip, and has a signal processing capability. In an implementation process, steps in the foregoing method embodiments may be implemented by a hardware integrated logic circuit in the processor, or by using instructions in a form of software. The processor may be a general-purpose processor, a DSP, an ASIC, a FPGA or another programmable logic device, a discrete gate or transistor logic device, or a discrete hardware component. The processor may implement or perform the methods, steps, and logical block diagrams that are disclosed in embodiments of this application.

It may be understood that the memory in embodiments of this application may be a volatile memory or a nonvolatile memory, or may include a volatile memory and a nonvolatile memory. The nonvolatile memory may be a ROM, a PROM, an EPROM, an EEPROM, or a flash memory. The volatile memory may be a RAM and is used as an external cache. By way of example but not limitation, RAMs in many forms may be used, for example, a SRAM, a DRAM, a SDRAM, a DDR SDRAM, an ESDRAM, a SLDRAM, and a DR RAM. It should be noted that the memory described in embodiments of this application aims to include but is not limited to these memories and any memory of another proper type.

Figure 15:
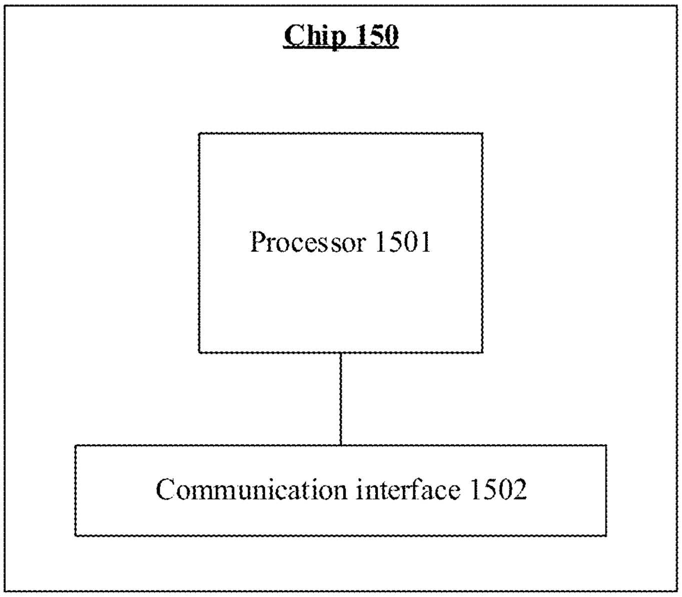
FIG. 15 is a schematic diagram of a structure of a communication chip according to an embodiment of this application.

FIG. 15 is a schematic diagram of a structure of a communication chip according to an embodiment of this application. As shown in FIG. 15, the communication chip 150 may include a processor 1501 and one or more communication interfaces 1502 coupled to the processor 1501.

The processor 1501 may be configured to: read and execute computer-readable instructions. In an implementation, the processor 1501 may include a controller, an arithmetic unit, and a register. The controller is responsible for decoding instructions and sending a control signal for an operation corresponding to the instructions. The arithmetic unit is responsible for performing a fixed-point or floating-point arithmetic operation, a shift operation, a logic operation, and the like, and may also perform an address operation and address translation. The register is responsible for saving a quantity of register operations, intermediate operation results, and the like that are temporarily stored during instruction execution. In an implementation, a hardware architecture of the processor 1501 may be an ASIC architecture, a microprocessor without interlocked pipelined stages (MIPS) architecture, an ARM architecture, an NP architecture, or the like. The processor 1501 may be a single-core or multi-core processor.

The interface 1502 may be configured to input a to-be-processed signal or data to the processor 1501, and may output a processing result of the processor 1501 to the outside. For example, the communication interface 1502 may be a general-purpose input/output (GPIO) interface, and may be connected to a plurality of peripheral devices (such as a display (e.g. liquid crystal display (LCD)), a camera, and a radio frequency (RF) module).

In this application, the processor 1501 may be configured to invoke, from a memory, a program for implementing, on a transmitting end device side, a communication method provided in one or more embodiments of this application, and execute instructions included in the program; or invoke, from a memory, a program for implementing, on a receiving end device side, a communication method provided in one or more embodiments of this application, and execute instructions included in the program. The communication interface 1502 may be configured to output an execution result of the processor 1501. In this application, the communication interface 1502 may be configured to: output a first symbol sequence obtained by the processor 1501 through modulation, or output a first bit sequence obtained by the processor 1501 through decoding. For the communication method provided in one or more embodiments of this application, refer to the embodiment shown in FIG. 1, FIG. 8, or FIG. 9. Details are not described herein again.

It should be noted that functions corresponding to each of the processor 1501 and the communication interface 1502 may be implemented by using a hardware design, or may be implemented by using a software design, or may be implemented by using a combination of software and hardware. This is not limited herein.

In another embodiment of this application, a communication system is further provided. The communication system includes a network device and a terminal device. For example, the network device may be the network device in FIG. 9, or may include the communication apparatus provided in FIG. 10 or FIG. 11, and is configured to perform steps S201 and S202 in the method provided in FIG. 2; and/or the terminal device may be the terminal device provided in FIG. 12, or may include the communication apparatus provided in FIG. 13 or FIG. 14, and is configured to perform the steps of receiving the first signaling and receiving the second signaling in the communication method provided in FIG. 2.

An embodiment of this application further provides a computer storage medium. The computer storage medium stores computer executable instructions. When a device (which may be a single-chip microcomputer, a chip, or the like) or a processor invokes the computer executable instructions stored in the readable storage medium, the steps performed by the network device or the terminal device in the method provided in the embodiment shown in FIG. 2, FIG. 7, or FIG. 8 are implemented. The readable storage medium may include any medium that can store program code, such as a universal serial bus (USB) flash drive, a removable hard disk, a ROM, a RAM, a magnetic disk, or an optical disc.

In another embodiment of this application, a computer program product is further provided. The computer program product includes computer executable instructions, and the computer executable instructions are stored in a computer-readable storage medium. At least one processor of a device may read the computer executable instructions from the computer-readable storage medium, to implement the steps performed by the network device or the terminal device in the method provided in the embodiment shown in FIG. 2, FIG. 7, or FIG. 8.

All or some of the foregoing method embodiments may be implemented by using software, hardware, firmware, or any combination thereof. When software is used to implement the embodiments, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that the terms "system" and "network" may be usually used interchangeably in embodiments of this application. The term "and/or" in embodiments describes only an association relationship between associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that, units and algorithm steps in the examples described with reference to embodiments disclosed in this specification can be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

In embodiments provided in this application, it should be understood that the disclosed systems, apparatuses, and methods may be implemented in other manners. For example, the foregoing apparatuses are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

In conclusion, the foregoing descriptions are merely example embodiments of the technical solutions in this application, but are not intended to limit the protection scope of this application. Any modification, equivalent replacement, or improvement made without departing from the spirit and principle of this application shall fall within the protection scope of this application.

What is claimed is:

1. A method, wherein the method comprises:

sending, by a network device, first signaling, wherein the first signaling carries first indication information, the first indication information indicates a subset identifier corresponding to a first precoding subset in a first codebook, the first codebook comprises a plurality of precoding subsets, each precoding subset comprises a plurality of precoding matrices, and different precoding subsets correspond to different subset identifiers; and sending, by the network device, second signaling, wherein the second signaling carries second indication information, the second indication information indicates a matrix identifier corresponding to a first precoding matrix in the first precoding subset, different precoding matrices in the first precoding subset correspond to different matrix identifiers, and the first precoding matrix is used to precode a physical uplink shared channel (PUSCH) carried on a first subband.

2. The method according to claim 1, wherein the second indication information further indicates a matrix identifier corresponding to a second precoding matrix in the first precoding subset, the second precoding matrix is used to precode a PUSCH carried on a second subband, and the second subband and the first subband are different frequency domain resources in a same frequency band.

3. The method according to claim 1, wherein a first frequency band comprises a plurality of second subbands, a second frequency band comprises a plurality of third subbands, the first subband is one of the plurality of third subbands, and a frequency domain resource comprised in one third subband is a subset of frequency domain resources comprised in one second subband; and the first indication information indicates a subset identifier of a precoding subset corresponding to each second subband, and the second indication information indicates a matrix identifier of a precoding matrix corresponding to each third subband.

4. The method according to claim 1, wherein the first indication information indicates a subset identifier of a precoding subset corresponding to each subband in a first frequency band, the second indication information indicates a matrix identifier of a precoding matrix corresponding to each subband in the first frequency band, and the first subband is a subband in the first frequency band.

5. The method according to claim 1, wherein the precoding matrix in the first codebook is determined based on a first phase factor and a second phase factor, and the first phase factor and the second phase factor each have at least two different values; and precoding matrices in a same precoding subset are determined based on a same value of the first phase factor and different values of the second phase factor.

6. A method, wherein the method comprises:

receiving, by a terminal device, first signaling, wherein the first signaling carries first indication information, the first indication information indicates a subset identifier corresponding to a first precoding subset in a first codebook, the first codebook comprises a plurality of precoding subsets, each precoding subset comprises a plurality of precoding matrices, and different precoding subsets correspond to different subset identifiers; and receiving, by the terminal device, a second signaling, wherein the second signaling carries second indication information, the second indication information indicates a matrix identifier corresponding to a first precoding matrix in the first precoding subset, different precoding matrices in the first precoding subset correspond to different matrix identifiers, and the first precoding matrix is used to precode a physical uplink shared channel (PUSCH) carried on a first subband.

7. The method according to claim 6, wherein the second indication information further indicates a matrix identifier corresponding to a second precoding matrix in the first precoding subset, the second precoding matrix is used to precode a PUSCH carried on a second subband, and the second subband and the first subband are different frequency domain resources in a same frequency band.

8. The method according to claim 6, wherein a first frequency band comprises a plurality of second subbands, a second frequency band comprises a plurality of third subbands, the first subband is one of the third subbands, and a frequency domain resource comprised in one third subband is a subset of frequency domain resources comprised in one second subband; and the first indication information indicates a subset identifier of a precoding subset corresponding to each second subband, and the second indication information indicates a matrix identifier of a precoding matrix corresponding to each third subband.

9. The method according to claim 6, wherein the first indication information indicates a subset identifier of a precoding subset corresponding to each subband in a first frequency band, the second indication information indicates a matrix identifier of a precoding matrix corresponding to each subband in the first frequency band, and the first subband is a subband in the first frequency band.

10. The method according to claim 6, wherein the precoding matrix in the first codebook is determined based on a first phase factor and a second phase factor, and the first phase factor and the second phase factor each have at least two different values; and precoding matrices in a same precoding subset are determined based on a same value of the first phase factor and different values of the second phase factor.

11. A communication apparatus, comprising:

at least one processor; and one or more memories coupled to the at least one processor and storing programming instructions for execution by the at least one processor to cause the apparatus to:

send first signaling, wherein the first signaling carries first indication information, the first indication information indicates a subset identifier corresponding to a first precoding subset in a first codebook, the first codebook comprises a plurality of precoding subsets, each precoding subset comprises a plurality of precoding matrices, and different precoding subsets correspond to different subset identifiers; and send second signaling, wherein the second signaling carries second indication information, the second indication information indicates a matrix identifier corresponding to a first precoding matrix in the first precoding subset, different precoding matrices in the first precoding subset correspond to different matrix identifiers, and the first precoding matrix is used to precode a physical uplink shared channel (PUSCH) carried on a first subband.

12. The communication apparatus according to claim 11, wherein the second indication information further indicates a matrix identifier corresponding to a second precoding matrix in the first precoding subset, the second precoding matrix is used to precode a PUSCH carried on a second subband, and the second subband and the first subband are different frequency domain resources in a same frequency band.

13. The communication apparatus according to claim 11, wherein a first frequency band comprises a plurality of second subbands, a second frequency band comprises a plurality of third subbands, the first subband is one of the plurality of third subbands, and a frequency domain resource comprised in one third subband is a subset of frequency domain resources comprised in one second subband; and the first indication information indicates a subset identifier of a precoding subset corresponding to each second subband, and the second indication information indicates a matrix identifier of a precoding matrix corresponding to each third subband.

14. The communication apparatus according to claim 11, wherein the first indication information indicates a subset identifier of a precoding subset corresponding to each subband in a first frequency band, the second indication information indicates a matrix identifier of a precoding matrix corresponding to each subband in the first frequency band, and the first subband is a subband in the first frequency band.

15. The communication apparatus according to claim 11, wherein the precoding matrix in the first codebook is determined based on a first phase factor and a second phase factor, and the first phase factor and the second phase factor each have at least two different values; and precoding matrices in a same precoding subset are determined based on a same value of the first phase factor and different values of the second phase factor.

16. A communication apparatus, comprising:

at least one processor; and one or more memories coupled to the at least one processor and storing programming instructions for execution by the at least one processor to cause the apparatus to:

receive first signaling, wherein the first signaling carries first indication information, the first indication information indicates a subset identifier corresponding to a first precoding subset in a first codebook, the first codebook comprises a plurality of precoding subsets, each precoding subset comprises a plurality of precoding matrices, and different precoding subsets correspond to different subset identifiers; and receive second signaling, wherein the second signaling carries second indication information, the second indication information indicates a matrix identifier corresponding to a first precoding matrix in the first precoding subset, different precoding matrices in the first precoding subset correspond to different matrix identifiers, and the first precoding matrix is used to precode a physical uplink shared channel (PUSCH) carried on a first subband.

17. The communication apparatus according to claim 16, wherein the second indication information further indicates a matrix identifier corresponding to a second precoding matrix in the first precoding subset, the second precoding matrix is used to precode a PUSCH carried on a second subband, and the second subband and the first subband are different frequency domain resources in a same frequency band.

18. The communication apparatus according to claim 16, wherein a first frequency band comprises a plurality of second subbands, a second frequency band comprises a plurality of third subbands, the first subband is one of the third subbands, and a frequency domain resource comprised in one third subband is a subset of frequency domain resources comprised in one second subband; and the first indication information indicates a subset identifier of a precoding subset corresponding to each second subband, and the second indication information indicates a matrix identifier of a precoding matrix corresponding to each third subband.

19. The communication apparatus according to claim 16, wherein the first indication information indicates a subset identifier of a precoding subset corresponding to each subband in a first frequency band, the second indication information indicates a matrix identifier of a precoding matrix corresponding to each subband in the first frequency band, and the first subband is a subband in the first frequency band.

20. The communication apparatus according to claim 16, wherein the precoding matrix in the first codebook is determined based on a first phase factor and a second phase factor, and the first phase factor and the second phase factor each have at least two different values; and precoding matrices in a same precoding subset are determined based on a same value of the first phase factor and different values of the second phase factor.

* * * * *